(12) United States Patent
Murphy

(10) Patent No.: US 12,609,847 B2
(45) Date of Patent: Apr. 21, 2026

(54) APPARATUS, SYSTEM, AND METHOD FOR REMOTELY MONITORING AND CONTROLING POOL/SPA EQUIPMENT

(71) Applicant: Intermatic Incorporated, Libertyville, IL (US)

(72) Inventor: Charles Murphy, Oakwood, OH (US)

(73) Assignee: Intermatic LLC, Libertyville, IL (US)

( * ) Notice: Subject to any disclaimer, the term of this patent is extended or adjusted under 35 U.S.C. 154(b) by 253 days.

(21) Appl. No.: 17/945,723

(22) Filed: Sep. 15, 2022

(65) Prior Publication Data

US 2023/0079982 A1 Mar. 16, 2023

Related U.S. Application Data

(60) Provisional application No. 63/244,687, filed on Sep. 15, 2021.

(51) Int. Cl.
| | |
|---|---|
| *E04H 4/12* | (2006.01) |
| *G06F 3/04847* | (2022.01) |
| *H04L 12/28* | (2006.01) |

(52) U.S. Cl.
CPC ....... *H04L 12/2823* (2013.01); *E04H 4/1245* (2013.01); *E04H 4/129* (2013.01);
(Continued)

(58) Field of Classification Search
CPC ............. H04L 12/2823; H04L 12/2825; H04L 12/282; H04L 12/2816; E04H 4/1245; E04H 4/129; G06F 3/04847
See application file for complete search history.

(56) References Cited

U.S. PATENT DOCUMENTS

| | | | |
|---|---|---|---|
| 5,361,215 | A | 11/1994 | Tompkins |
| 5,559,720 | A | 9/1996 | Tompkins |

(Continued)

FOREIGN PATENT DOCUMENTS

| | | | |
|---|---|---|---|
| EP | 2135141 A4 | 12/2011 | |
| EP | 2612484 A2 | 7/2013 | |

(Continued)

OTHER PUBLICATIONS

Goncalo Simoes et al., Smart System for Monitoring and Control of Swimming Pools, Apr. 1, 2019, IEEE 5th World Forum on Internet of Things, pp. 1-4 (Year: 2019).*

(Continued)

*Primary Examiner* — Tam T Tran
(74) *Attorney, Agent, or Firm* — Fitch, Even, Tabin & Flannery LLP

(57) ABSTRACT

A method of adjusting pool or spa equipment parameters in a multi-vendor pool or spa equipment system is provided. The method includes providing a pool or spa equipment system including a plurality of different pool or spa equipment provided by a plurality of different pool or spa equipment suppliers with each of the plurality of different pool or spa equipment having its own adjustable parameters. The method includes connecting the plurality of different pool or spa equipment to a software application via a local network and receiving and displaying current parameter data of the connected plurality of different pool or spa equipment on the software application. The method further includes adjusting, via the software application, the parameters of any one of the connected plurality of different pool or spa equipment.

21 Claims, 30 Drawing Sheets

(52) U.S. Cl.
     CPC ........ *G06F 3/04847* (2013.01); *H04L 12/282*
                  (2013.01); *H04L 12/2816* (2013.01)

(56)                    References Cited

U.S. PATENT DOCUMENTS

| | | | |
|---|---|---|---|
| 6,253,227 B1 | 6/2001 | Tompkins | |
| 6,407,469 B1 | 6/2002 | Cline | |
| 6,718,567 B2 | 4/2004 | Gibson | |
| 6,747,367 B2 | 6/2004 | Cline | |
| 6,782,309 B2 | 8/2004 | Laflamme | |
| 6,965,815 B1 | 11/2005 | Tompkins | |
| 6,976,052 B2 | 12/2005 | Tompkins | |
| 7,155,213 B1 | 12/2006 | Almeda | |
| 7,158,909 B2 | 1/2007 | Tarpo | |
| 7,167,087 B2 | 1/2007 | Corrington | |
| 7,292,898 B2 | 11/2007 | Clark | |
| 7,395,559 B2 | 7/2008 | Gibson | |
| 7,397,360 B2 | 7/2008 | Corrington | |
| 7,398,138 B2 | 7/2008 | Emery | |
| 7,440,864 B2 | 10/2008 | Otto | |
| 7,489,986 B1 | 2/2009 | Laflamme | |
| 7,619,181 B2 | 11/2009 | Authier | |
| 7,854,597 B2 | 12/2010 | Stiles, Jr. | |
| 7,874,808 B2 | 1/2011 | Stiles | |
| 8,014,902 B2 | 9/2011 | Kates | |
| 8,145,357 B2 | 3/2012 | Nibler | |
| 8,254,901 B2 | 8/2012 | Almeda | |
| 8,280,535 B2 | 10/2012 | Hsieh | |
| 8,467,908 B2 | 6/2013 | Broniak | |
| 8,489,242 B2 | 7/2013 | Valluri | |
| 8,565,928 B2 | 10/2013 | Venkatakrishnan | |
| 8,589,816 B2 | 11/2013 | Hofrichter | |
| 8,612,061 B2 | 12/2013 | Laflamme | |
| 8,644,960 B2 | 2/2014 | Laflamme | |
| 8,649,908 B2 | 2/2014 | Nibler | |
| 8,650,311 B2 | 2/2014 | Dattagupta | |
| 8,668,280 B2 | 3/2014 | Heller | |
| 8,688,280 B2 | 4/2014 | Macey | |
| 8,817,662 B2 | 8/2014 | Mahaffy | |
| 8,831,584 B2 | 9/2014 | Almeda | |
| 8,838,280 B2 | 9/2014 | Macey | |
| 8,868,038 B2 | 10/2014 | Cherian | |
| 9,031,702 B2 | 5/2015 | David | |
| 9,058,027 B2 | 6/2015 | Macey | |
| 9,143,402 B2 | 9/2015 | Tinnakornsrisuphap | |
| 9,253,712 B2 | 2/2016 | Cherian | |
| 9,285,790 B2 | 3/2016 | David | |
| 9,405,441 B2 | 8/2016 | Trafton | |
| 9,442,639 B2 | 9/2016 | Laflamme | |
| 9,453,827 B2 | 9/2016 | Maisonnier | |
| RE46,219 E | 11/2016 | Kates | |
| 9,494,952 B2 | 11/2016 | Storm | |
| 9,501,072 B2 | 11/2016 | Potucek | |
| 9,531,844 B2 | 12/2016 | Zhou | |
| 9,594,384 B2 | 3/2017 | Bergman | |
| 9,638,193 B2 | 5/2017 | Bishop | |
| 9,655,810 B2 | 5/2017 | Macey | |
| 9,791,840 B2 | 10/2017 | Michelon | |
| 9,834,451 B2 | 12/2017 | Miller | |
| 9,885,193 B2 | 2/2018 | Chen | |
| 9,920,766 B2 | 3/2018 | Bishop | |
| 10,037,675 B2 | 7/2018 | Uy | |
| 10,127,362 B2 | 11/2018 | Bennett | |
| 10,159,624 B2 | 12/2018 | Laflamme | |
| 10,191,483 B2 | 1/2019 | Michelon | |
| 10,219,975 B2 | 3/2019 | Potucek | |
| 10,228,359 B2 | 3/2019 | Laflamme | |
| 10,235,033 B2 | 3/2019 | Laflamme | |
| 10,240,606 B2 | 3/2019 | Stiles, Jr. | |
| 10,255,784 B2 | 4/2019 | Uy | |
| 10,272,014 B2 | 4/2019 | Potucek | |
| 10,363,197 B2 | 7/2019 | Potucek | |
| 10,371,685 B2 | 8/2019 | Laflamme | |
| 10,375,543 B2 | 8/2019 | Mcqueen | |
| 10,398,624 B2 | 9/2019 | Authier | |
| 10,465,676 B2 | 11/2019 | Robol | |
| 10,492,268 B2 | 11/2019 | Potucek | |
| 10,527,043 B2 | 1/2020 | Wung | |
| 10,560,820 B2 | 2/2020 | Mcqueen | |
| 10,621,848 B2 | 4/2020 | Uy | |
| 10,624,812 B2 | 4/2020 | Laflamme | |
| 10,737,951 B2 | 8/2020 | Miller | |
| 10,809,905 B2 | 10/2020 | Laflamme | |
| 10,865,787 B2 | 12/2020 | Bishop | |
| 10,871,163 B2 | 12/2020 | Stiles, Jr. | |
| 10,883,489 B2 | 1/2021 | Robol | |
| 10,909,834 B2 | 2/2021 | Uy | |
| 10,925,804 B2 | 2/2021 | Ovalle | |
| 10,931,472 B2 | 2/2021 | Khalid | |
| 10,942,989 B2 | 3/2021 | Bennett | |
| 10,942,990 B2 | 3/2021 | Bennett | |
| 10,947,981 B2 | 3/2021 | Stiles | |
| 10,951,433 B2 | 3/2021 | Khalid | |
| 10,972,305 B2 | 4/2021 | Guilfoyle | |
| 10,976,713 B2 | 4/2021 | Potucek | |
| 10,985,939 B2 | 4/2021 | Clark | |
| 11,000,449 B2 | 5/2021 | Potucek | |
| 11,015,606 B2 | 5/2021 | Bishop | |
| 11,025,448 B2 | 6/2021 | Khalid | |
| 11,082,251 B2 | 8/2021 | Khalid | |
| 11,091,924 B2 | 8/2021 | Chen | |
| 11,096,024 B2 | 8/2021 | Mcqueen | |
| 11,096,862 B2 | 8/2021 | Potucek | |
| 11,097,958 B2 | 8/2021 | Miller | |
| 11,098,958 B2 | 8/2021 | Machida | |
| 11,108,585 B2 | 8/2021 | Khalid | |
| 11,121,887 B2 | 9/2021 | Khalid | |
| 11,122,669 B2 | 9/2021 | Potucek | |
| 11,129,256 B2 | 9/2021 | Potucek | |
| 11,139,997 B2 | 10/2021 | Khalid | |
| 11,153,113 B2 | 10/2021 | Khalid | |
| 11,213,455 B2 | 1/2022 | Laflamme | |
| 11,256,274 B2 | 2/2022 | Potucek | |
| 11,259,256 B2 | 2/2022 | Zhou | |
| 11,307,600 B2 | 4/2022 | Doan | |
| 11,376,190 B2 | 7/2022 | Ovalle | |
| 11,386,768 B2 | 7/2022 | Uy | |
| 11,426,325 B2 | 8/2022 | Blaine | |
| 11,455,092 B2 | 9/2022 | Laflamme | |
| 11,493,942 B2 | 11/2022 | Goldman | |
| 11,554,077 B1 | 1/2023 | Blaine | |
| 11,720,085 B2 | 8/2023 | Roy | |
| 11,723,836 B2 | 8/2023 | Blaine | |
| 11,789,475 B2 | 10/2023 | Goldman | |
| 11,800,623 B2 | 10/2023 | Leander | |
| 11,822,300 B2 | 11/2023 | Potucek | |
| 11,828,292 B1 * | 11/2023 | Evans | F04D 27/004 |
| 11,865,064 B2 | 1/2024 | Ovalle | |
| 11,924,001 B2 | 3/2024 | Khalid | |
| 11,957,637 B2 | 4/2024 | Ovalle | |
| 2005/0288821 A1 | 12/2005 | Laflamme | |
| 2007/0093920 A1 | 4/2007 | Tarpo | |
| 2007/0233420 A1 | 10/2007 | Potucek | |
| 2008/0021685 A1 | 1/2008 | Emery | |
| 2008/0039977 A1 | 2/2008 | Clark | |
| 2008/0144238 A1 | 6/2008 | Cline | |
| 2010/0018958 A1 | 1/2010 | Authier | |
| 2011/0091329 A1 | 4/2011 | Stiles, Jr. | |
| 2011/0195664 A1 | 8/2011 | Keirstead | |
| 2012/0146918 A1 * | 6/2012 | Kreiner | G06F 3/0481 |
| | | | 345/173 |
| 2012/0185571 A1 | 7/2012 | Uy | |
| 2013/0166965 A1 * | 6/2013 | Brochu | H04W 76/18 |
| | | | 709/224 |
| 2014/0064139 A1 | 3/2014 | Mcqueen | |
| 2014/0107848 A1 | 4/2014 | Macey | |
| 2014/0303757 A1 | 10/2014 | Pruchniewski | |
| 2014/0304446 A1 | 10/2014 | Fils | |
| 2014/0304447 A1 | 10/2014 | Fils | |
| 2014/0336821 A1 | 11/2014 | Blaine | |
| 2014/0364111 A1 | 12/2014 | Almeda | |
| 2015/0049750 A1 * | 2/2015 | Uy | H04L 67/125 |
| | | | 370/338 |
| 2015/0286194 A1 | 10/2015 | Michelon | |

(56) References Cited

U.S. PATENT DOCUMENTS

| | | | |
|---|---|---|---|
| 2015/0362925 A1 | 12/2015 | Uy | |
| 2016/0002942 A1 | 1/2016 | Orlando | |
| 2016/0175189 A1 | 6/2016 | Fils | |
| 2016/0212194 A1 | 7/2016 | Palin | |
| 2016/0373799 A1* | 12/2016 | Scovanner | H04N 21/4108 |
| 2017/0039230 A1 | 2/2017 | Trafton | |
| 2017/0170979 A1 | 6/2017 | Khalid | |
| 2017/0209338 A1 | 7/2017 | Potucek | |
| 2017/0211285 A1 | 7/2017 | Potucek | |
| 2017/0212484 A1 | 7/2017 | Potucek | |
| 2017/0212532 A1 | 7/2017 | Potucek | |
| 2017/0212536 A1 | 7/2017 | Potucek | |
| 2017/0213451 A1 | 7/2017 | Potucek | |
| 2017/0346688 A1 | 11/2017 | Reddy | |
| 2017/0372600 A1 | 12/2017 | Palin | |
| 2018/0174207 A1* | 6/2018 | Potucek | G06Q 50/08 |
| 2018/0224822 A1 | 8/2018 | Potucek | |
| 2018/0240322 A1* | 8/2018 | Potucek | E04H 4/14 |
| 2018/0254949 A1 | 9/2018 | Reddy | |
| 2018/0254950 A1 | 9/2018 | Reddy | |
| 2019/0105226 A1 | 4/2019 | Potucek | |
| 2019/0133880 A1 | 5/2019 | Potucek | |
| 2019/0149349 A1 | 5/2019 | Khalid | |
| 2019/0149352 A1 | 5/2019 | Khalid | |
| 2019/0158306 A1 | 5/2019 | Khalid | |
| 2019/0302084 A1 | 10/2019 | Laflamme | |
| 2019/0314243 A1* | 10/2019 | MacCallum | H04L 12/2816 |
| 2020/0009013 A1 | 1/2020 | Authier | |
| 2020/0030183 A1 | 1/2020 | Fils | |
| 2020/0311227 A1 | 10/2020 | Bennett | |
| 2020/0333813 A1 | 10/2020 | Goldman | |
| 2021/0102534 A1 | 4/2021 | Bishop | |
| 2021/0108643 A1 | 4/2021 | Stiles, Jr. | |
| 2021/0164477 A1 | 6/2021 | Stiles, Jr. | |
| 2021/0200837 A1 | 7/2021 | Bennett | |
| 2021/0244612 A1 | 8/2021 | Ovalle | |
| 2021/0298557 A1 | 9/2021 | Budampati | |
| 2021/0300804 A1 | 9/2021 | Broga | |
| 2021/0301985 A1 | 9/2021 | Brown | |
| 2021/0309539 A1 | 10/2021 | Budampati | |
| 2021/0367806 A1 | 11/2021 | Khalid | |
| 2021/0372154 A1 | 12/2021 | Chen | |
| 2021/0380435 A1 | 12/2021 | Miller | |
| 2021/0388627 A1* | 12/2021 | Brown | E04H 4/1281 |
| 2022/0042337 A1 | 2/2022 | Newman | |
| 2022/0051528 A1* | 2/2022 | Carlson | G07F 17/3223 |
| 2022/0070988 A1 | 3/2022 | Leander | |
| 2022/0110196 A1 | 4/2022 | Heng | |
| 2022/0113749 A1 | 4/2022 | Doan | |
| 2022/0179436 A1 | 6/2022 | Potucek | |
| 2022/0239523 A1* | 7/2022 | Wespel | H04N 21/42204 |
| 2022/0301406 A1 | 9/2022 | Uy | |
| 2022/0347050 A1 | 11/2022 | Ovalle | |
| 2022/0388871 A1 | 12/2022 | Eklund | |
| 2023/0017263 A1* | 1/2023 | Gan | H04L 9/0869 |
| 2023/0131356 A1 | 4/2023 | Potucek | |
| 2023/0142059 A1 | 5/2023 | Potucek | |
| 2023/0142306 A1 | 5/2023 | Potucek | |
| 2023/0144546 A1 | 5/2023 | Potucek | |
| 2023/0145381 A1 | 5/2023 | Potucek | |
| 2023/0145734 A1 | 5/2023 | Kevin | |
| 2023/0146187 A1 | 5/2023 | Potucek | |
| 2023/0147296 A1 | 5/2023 | Potucek | |
| 2023/0277413 A1 | 9/2023 | Blaine | |
| 2023/0279684 A1 | 9/2023 | Edward | |
| 2023/0418316 A1 | 12/2023 | Goldman | |

FOREIGN PATENT DOCUMENTS

| | | |
|---|---|---|
| EP | 2412981 B1 | 5/2016 |
| EP | 3538958 A1 | 9/2019 |
| EP | 3557340 A1 | 10/2019 |
| EP | 3405629 A4 | 1/2020 |
| EP | 3237977 B1 | 10/2020 |
| EP | 2972904 B1 | 5/2021 |
| EP | 3861639 A2 | 8/2021 |
| EP | 3620149 B1 | 10/2021 |
| EP | 3892250 A1 | 10/2021 |
| EP | 3746849 A4 | 11/2021 |
| EP | 2984346 B1 | 12/2021 |
| EP | 3927917 A1 | 12/2021 |
| WO | 2018086641 A1 | 5/2018 |
| WO | 2021091773 A1 | 5/2021 |
| WO | 2021221883 A1 | 11/2021 |
| WO | 2021258105 A1 | 12/2021 |
| WO | 2022072607 A1 | 4/2022 |

OTHER PUBLICATIONS

Wu-Jeng Li et al., JustIoT Internet of Things based on the Firebase Real-time Database, Feb. 1, 2018, IEEE International Conference on Smart Manufacturing—Industrial & Logistics Engineering, pp. 43-47 (Year: 2018).*

Ma Dong-Bao et al., Research on on-line Monitoring Method of Automatic Production Line based on Industrial Internet of Things, Dec. 15, 2020, IEEE International Conference on Industrial Application of Artificial Intelligent, pp. 1-5 (Year: 2020).*

Roger D. Chamberlain et al., Layered Security and Ease of Installation for Devices on the Internet of Things, Apr. 1, 2016, IEEE First International Conference on Internet-of-Things Design and Implementation, pp. 297-300 (Year: 2016).*

* cited by examiner

Figure 5B:
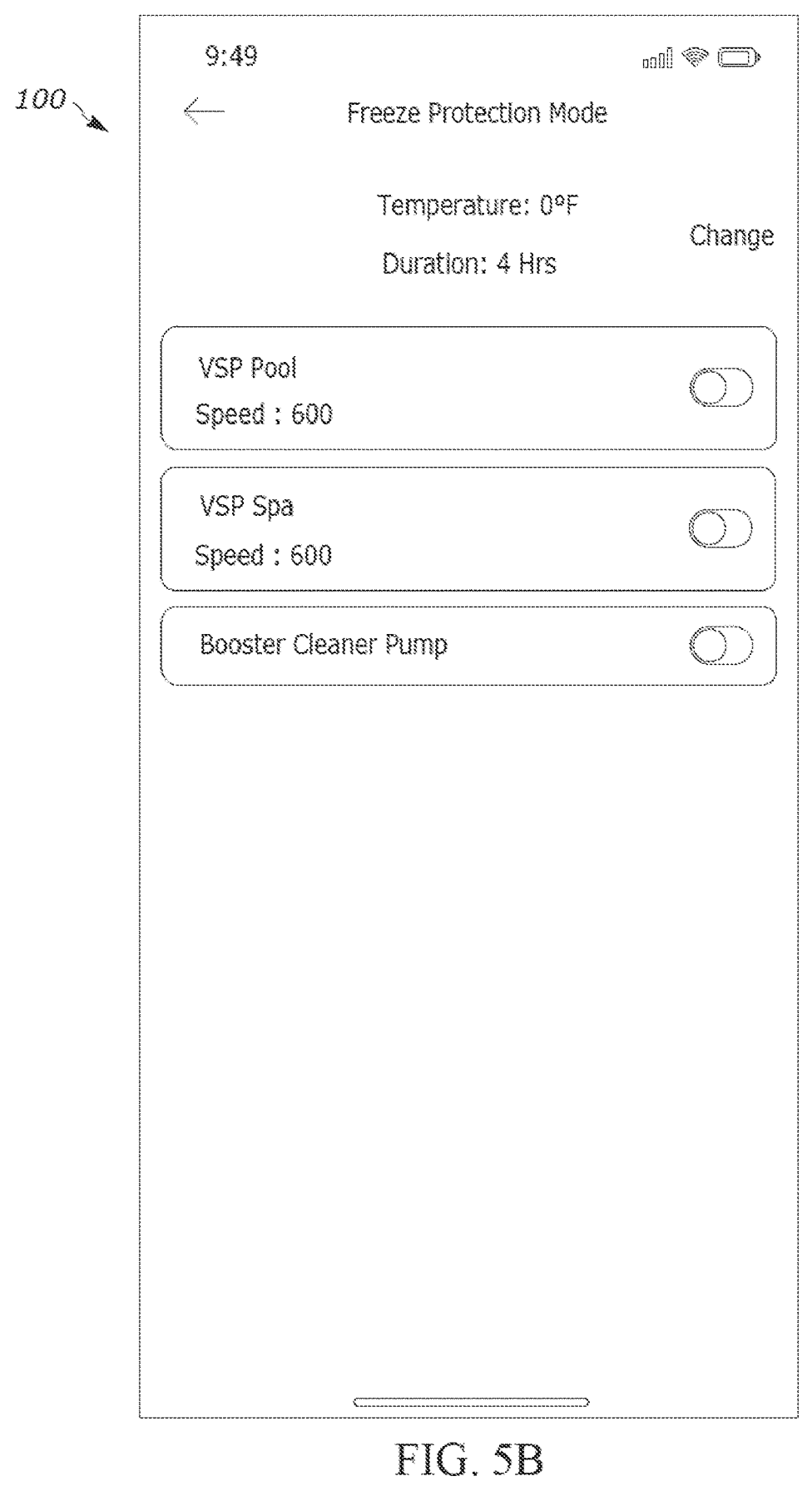

*100*

9:49

← Freeze Protection Mode

Temperature: 0°F

Change

Duration: 4 Hrs

VSP Pool

Speed : 600

VSP Spa

Speed : 600

Booster Cleaner Pump

Energy

Izzy's Pool
⊘ Online

Partly Cloudy
71°F/47°F

2021

| Month | Consumption | Total Price |
|---|---|---|
| January | 0.00 kwh + 0.0 cu ft | $0.00 |
| Feburary | 0.00 kwh + cu ft | $0.00 |
| March | 575.85 kwh + 107.9 cu ft | $194.28 |
| April | 152.67 kwh +107.9 cu ft | $130.80 |
| May | 0.00 kwh +0.0 cu ft | $0.00 |
| June | 0.00 kwh +0.0 cu ft | $0.00 |
| July | 0.00 kwh +0.0 cu ft | $0.00 |
| August | 0.00 kwh +0.0 cu ft | $0.00 |
| September | 0.00 kwh +0.0 cu ft | $0.00 |
| October | 0.00 kwh +0.0 cu ft | $0.00 |

Home    Modes    Energy    Schedules    Settings

100 ooIIl Airtel 📶    11:26    □ ◈ ▭

Figures 16A, 16B:
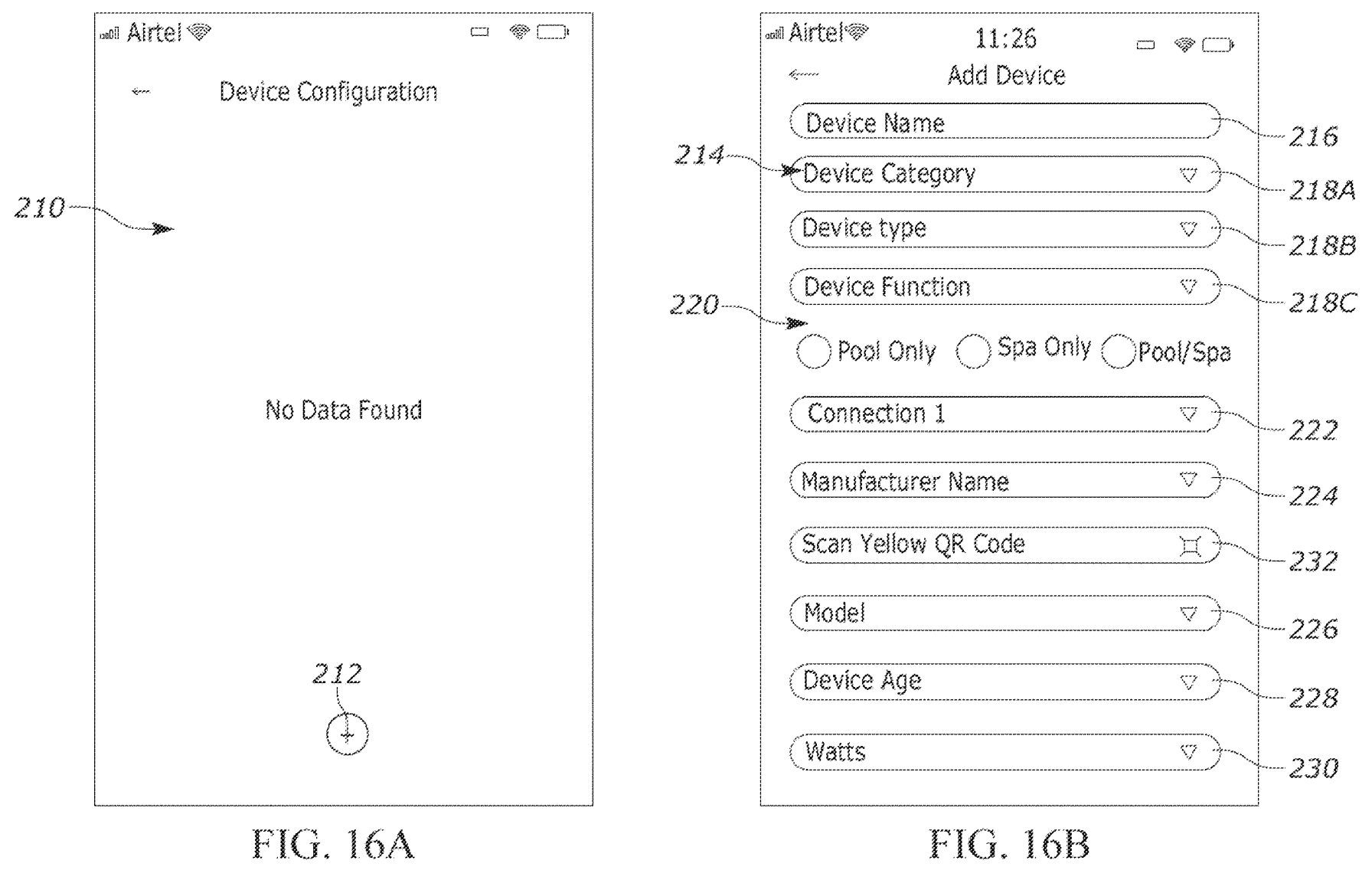

←     Add Device

Device Name    *216*

Device Category ▽    *218A*    *214*

Device type ▽    *218B*

Device Function ▽    *218C*

◯ Pool Only ◯ Spa Only ◯ Pool/Spa    *220*

Connection 1 ▽    *222*

Manufacturer Name ▽    *224*

Scan Yellow QR Code ⌗    *232*

Model ▽    *226*

Device Age ▽    *228*

Watts ▽    *230*

FIG. 16B ooIIl Airtel 📶    □ ◈ ▭

←     Device Configuration    *210*

No Data Found

Figure 16E:
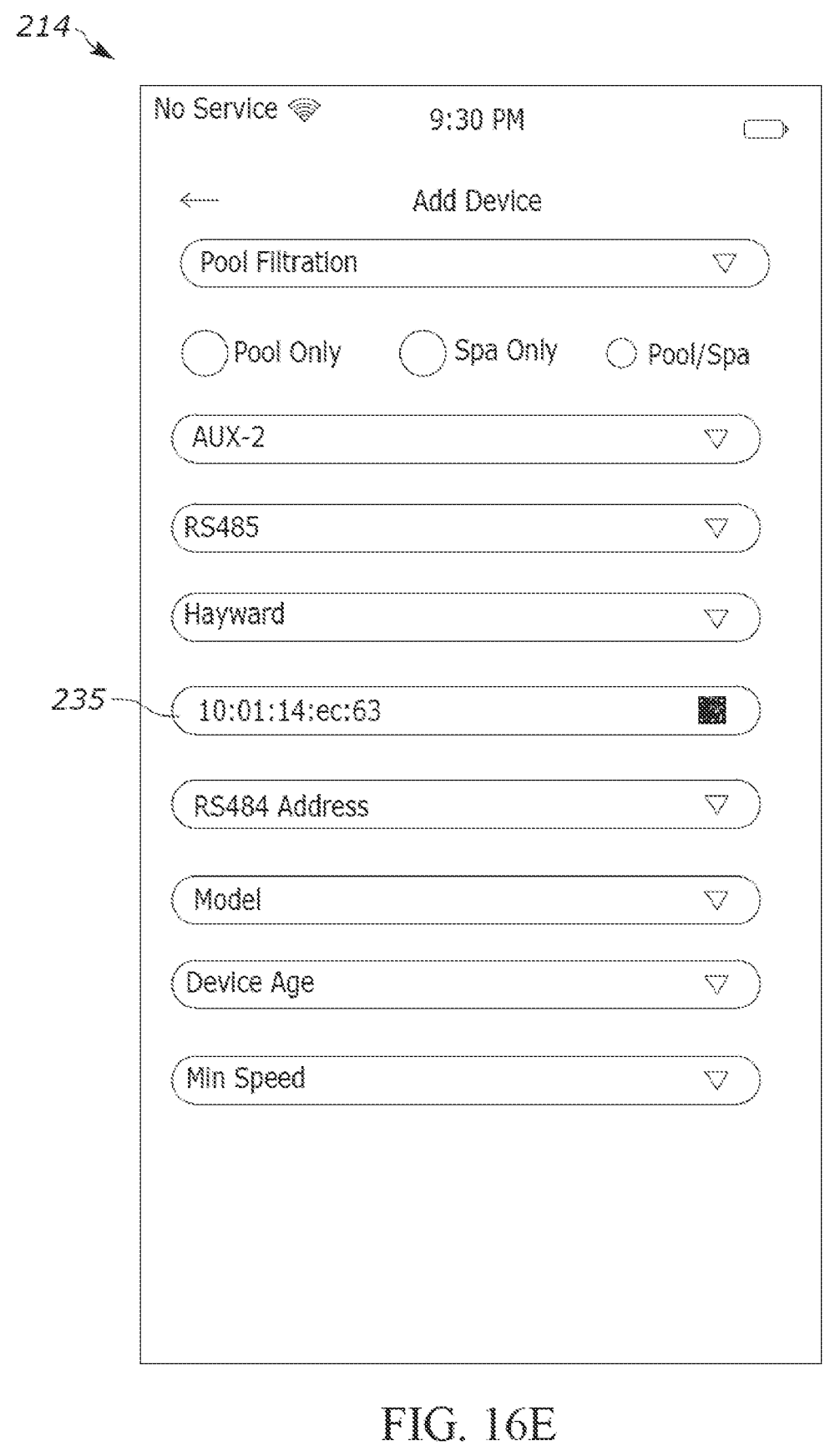

No Service 📶     9:30 PM

←     Add Device

Pool Filtration ▽

◯ Pool Only    ◯ Spa Only    ◯ Pool/Spa

AUX-2 ▽

RS485 ▽

Hayward ▽

235 — 10:01:14:ec:63 ▦

RS484 Address ▽

Model ▽

Device Age ▽

Min Speed ▽

APPARATUS, SYSTEM, AND METHOD FOR REMOTELY MONITORING AND CONTROLING POOL/SPA EQUIPMENT

CROSS-REFERENCE TO RELATED APPLICATIONS

This application claims the benefit of U.S. Provisional Application No. 63/244,687, filed Sep. 15, 2021, and is hereby incorporated herein by reference in its entirety.

FIELD

This application relates to monitoring and controlling pool and spa equipment and, in particular, to remotely monitoring and controlling the pool and spa equipment via a software application.

BACKGROUND

Pools and spas include a variety of equipment such as pumps, heaters, and filters. Often these pools and spas include equipment from a variety of vendors or manufacturers.

BRIEF DESCRIPTION OF THE DRAWINGS

FIGS. 5A-B are screenshots of examples pages of the smartphone application of FIG. 1 with various modes selectable by the user to adjust various parameters of the spa and pool equipment.

FIG. 6 is a screenshot of an example page of the smartphone application of FIG. 1 that displays energy usage data of the pool and spa system.

FIGS. 16A-16F are screenshots of examples pages of the smartphone application of FIG. 1 for adding a device to a user account of the smartphone application.

DETAILED DESCRIPTION

An apparatus, system, method and software are provided for remotely monitoring and controlling the equipment of a pool and/or spa. A software application ("app") is provided, for example, a smartphone application that a user may install on a user device such as a personal computer, tablet computer, smartphone. The user may create a user account and associate pool/spa equipment with a pool/spa system within the application. The pool/spa equipment may be configured to communicate over a network, such as Wi-Fi, Cellular and; or the internet, to send data pertaining to the operational state, energy usage, etc. for monitoring via the app. The user may also adjust operational settings of the pool/spa equipment by communicating control signals to the pool/spa equipment via the network. The app may be configured to communicate with pool/spa equipment of different brands or created by different manufacturers to receive data and communicate control signals. The app thus permits a user to control all of their network enabled pool equipment from a single app regardless of the brand of the pool/spa equipment.

Figure 1:
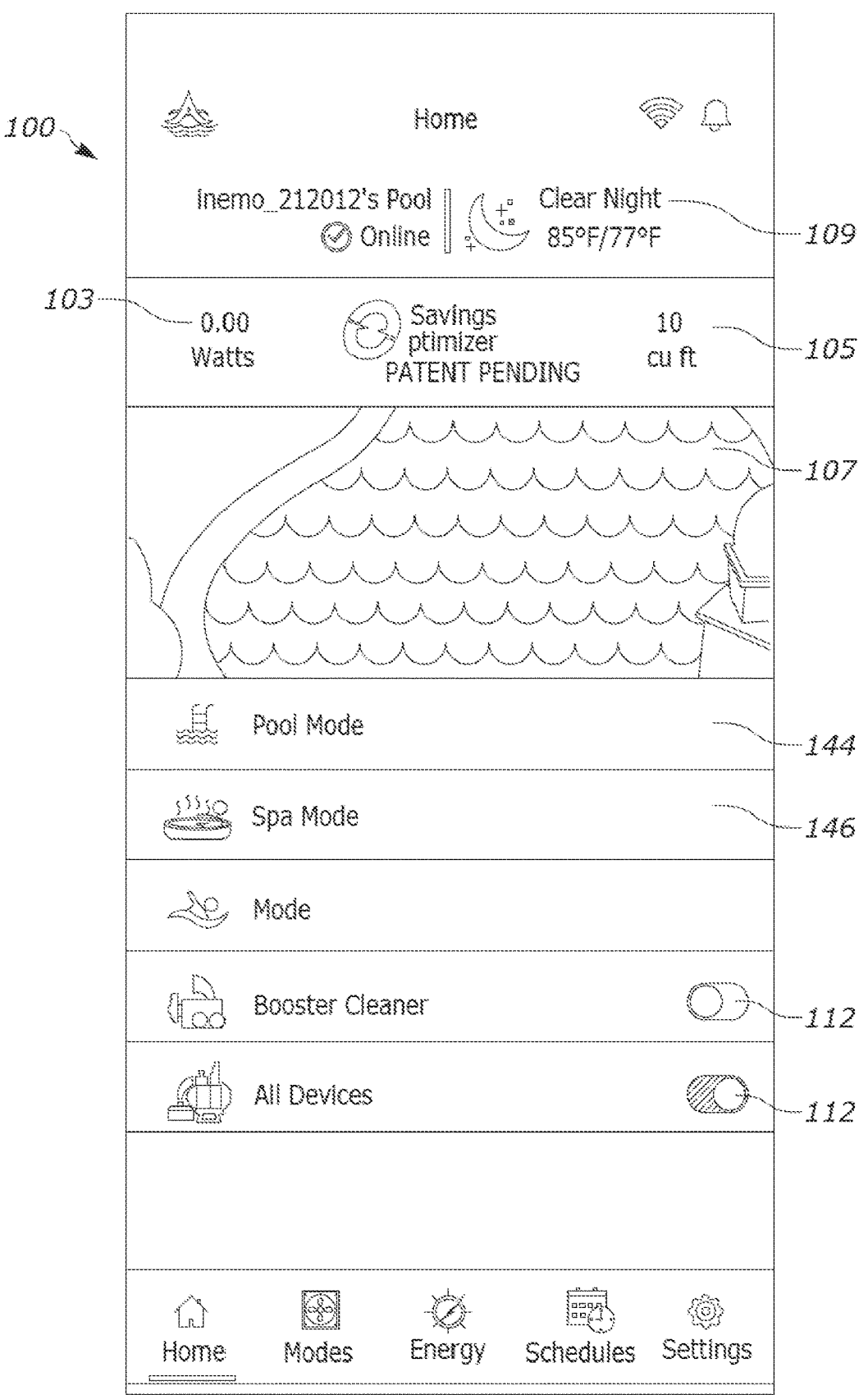
FIG. 1 is a screenshot of a homepage of a smartphone application for monitoring and controlling pool and/or spa equipment.

With respect to FIG. 1, a homepage of an app 100 is provided for monitoring and controlling pool/spa equipment 102 installed at a pool pad or pool/spa system. The app 100 may be downloaded from an app store and installed on a user device 104 such as a tablet computer or smartphone.

Figure 14:
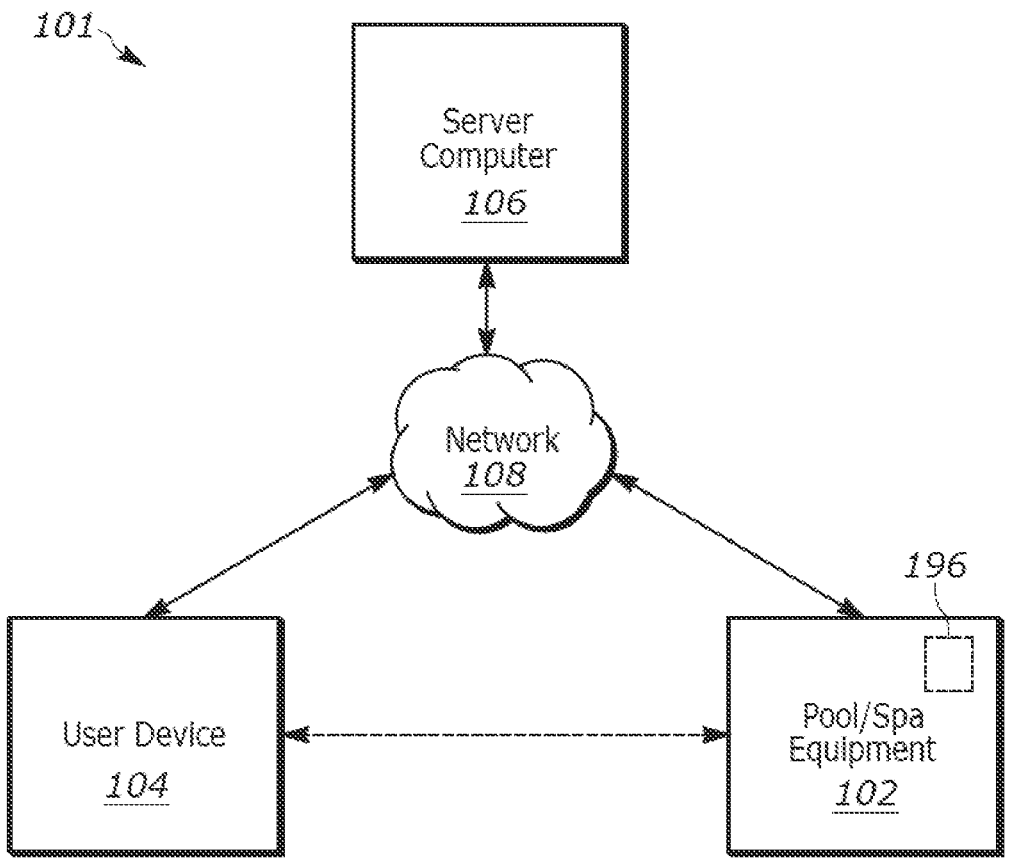
FIG. 14 is a schematic diagram of a user device running the smartphone application of FIG. 1 in communication with the pool and spa equipment.

With respect to FIG. 14, a system 101 for monitoring and controlling the pool/spa equipment is shown. The system 101 includes the pool/spa equipment 102 (which may include one or more devices at the pool/spa), the user device 104, a server computer 106, and a network 108. The user device 102 is configured to communicate via the network 108. The network 108 may be, as examples, a local area network (LAN), such as a Wi-Fi network or a wide area network (WAN) such as a Cellular network, so as to access another WAN such as the internet via same. The user device 102 runs the app 100 which may be associated with the server computer 106. The user device 102 is configured to communicate with pool/spa equipment 102 via the network 108. The pool/spa equipment 102 are also configured to communicate via the network 108 with the server computer 106 associated with the app 100. The pool/spa equipment 102 may include, as examples, a fluid pump, intake valve, return valve, heater (e.g., gas heater, heat pump, solar heater), bubble generator, jet generator, and/or lights. In some forms, the user device 104 is configured to communicate with the pool/spa equipment 102 directly, for example, via. Bluetooth, Zigbee or the like. This may be done when initially connecting the pool/spa equipment 102 to the app 100, for example, to connect the pool/spa equipment 102 to the correct WiFi network.

Figure 2A:
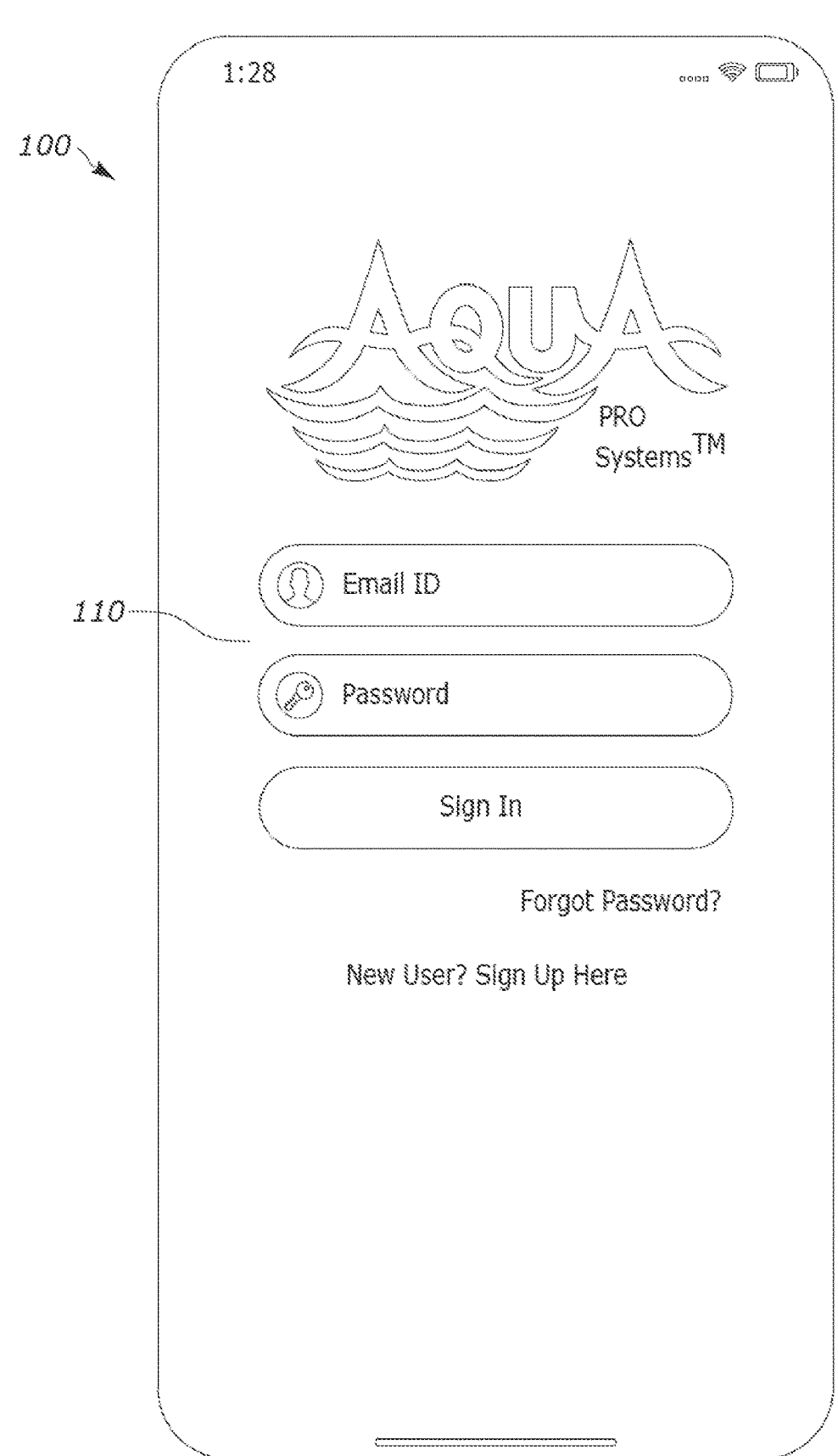
FIGS. 2A-B are screenshots of example pages of the smartphone application of FIG. 1 for access and setup of a user account for monitoring and controlling equipment of a pool and/or spa system.
Figure 2B:
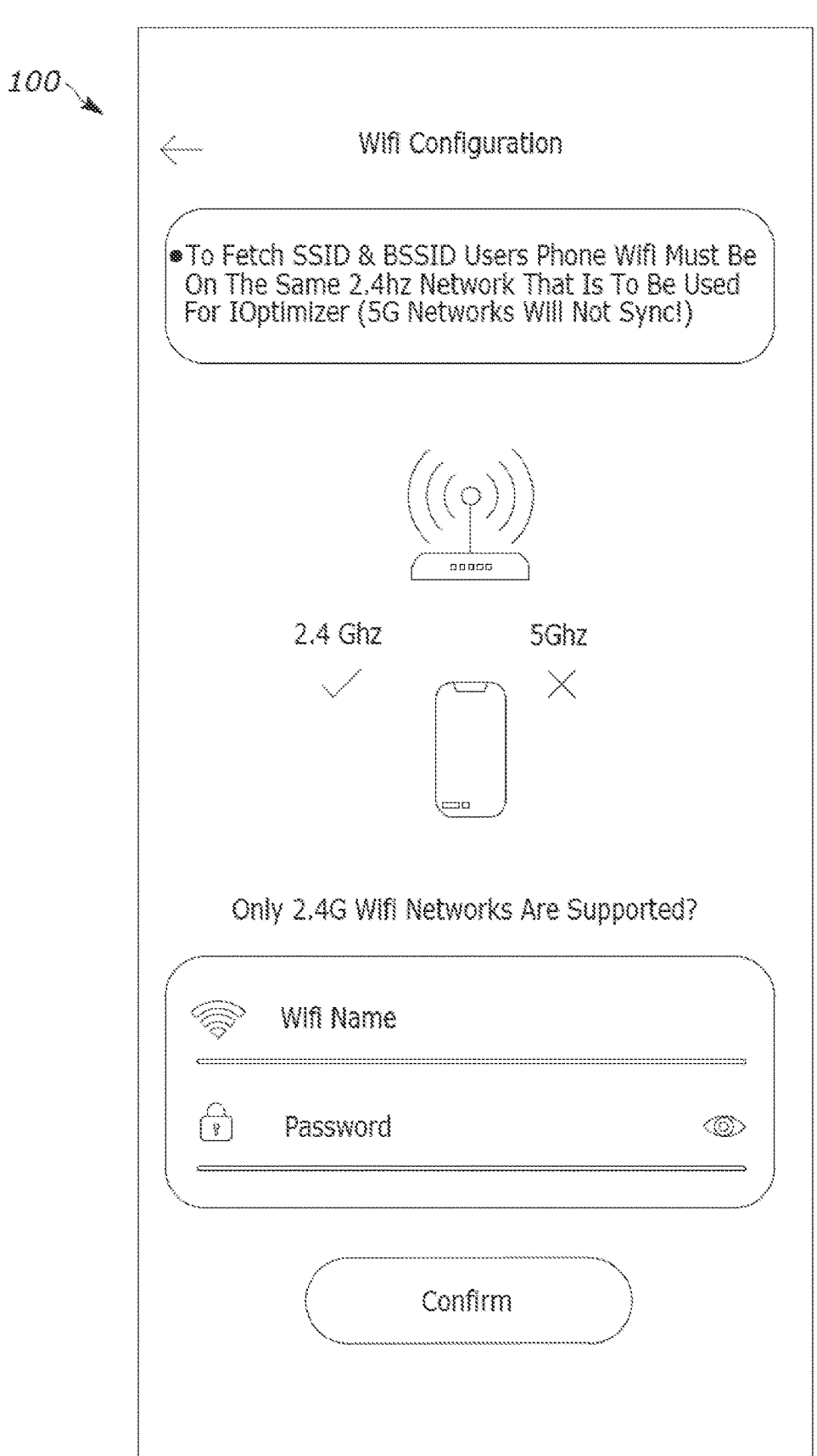
Figure 3A:
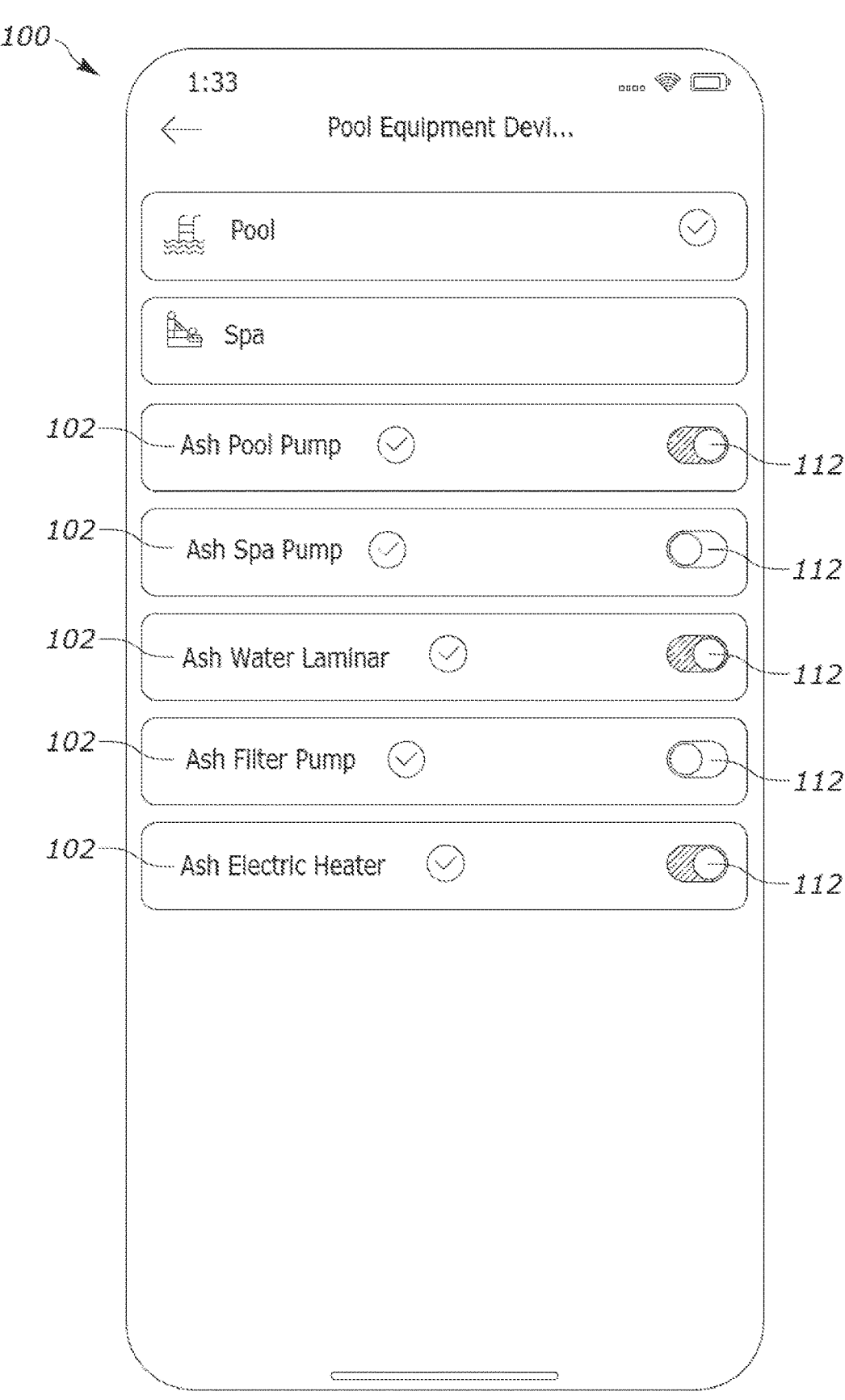
FIGS. 3A-C are screenshots of example pages of the smartphone application of FIG. 1 showing equipment of a pool and/or spa system associated with the user account for monitoring and control.
Figure 3B:
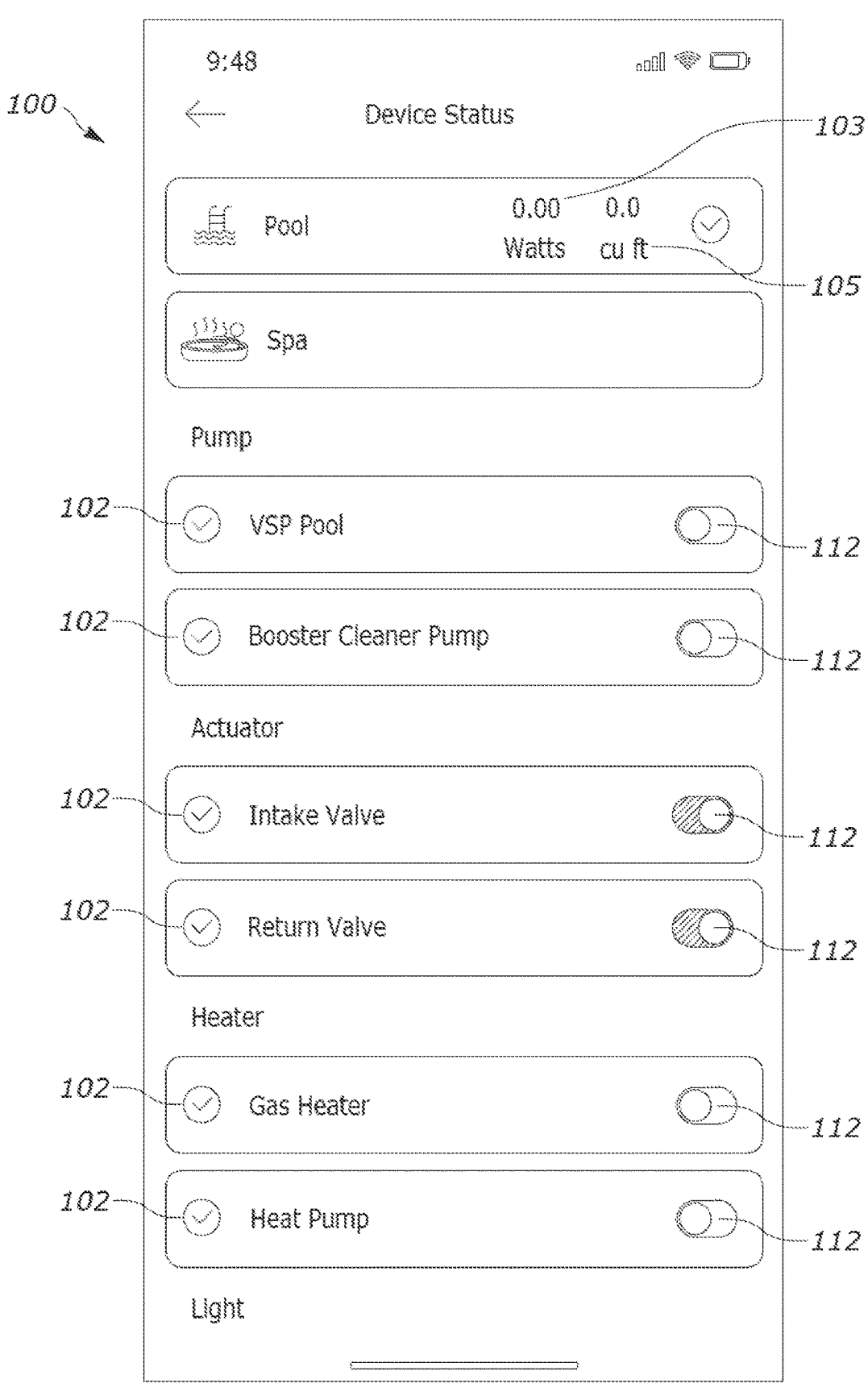
Figure 3C:
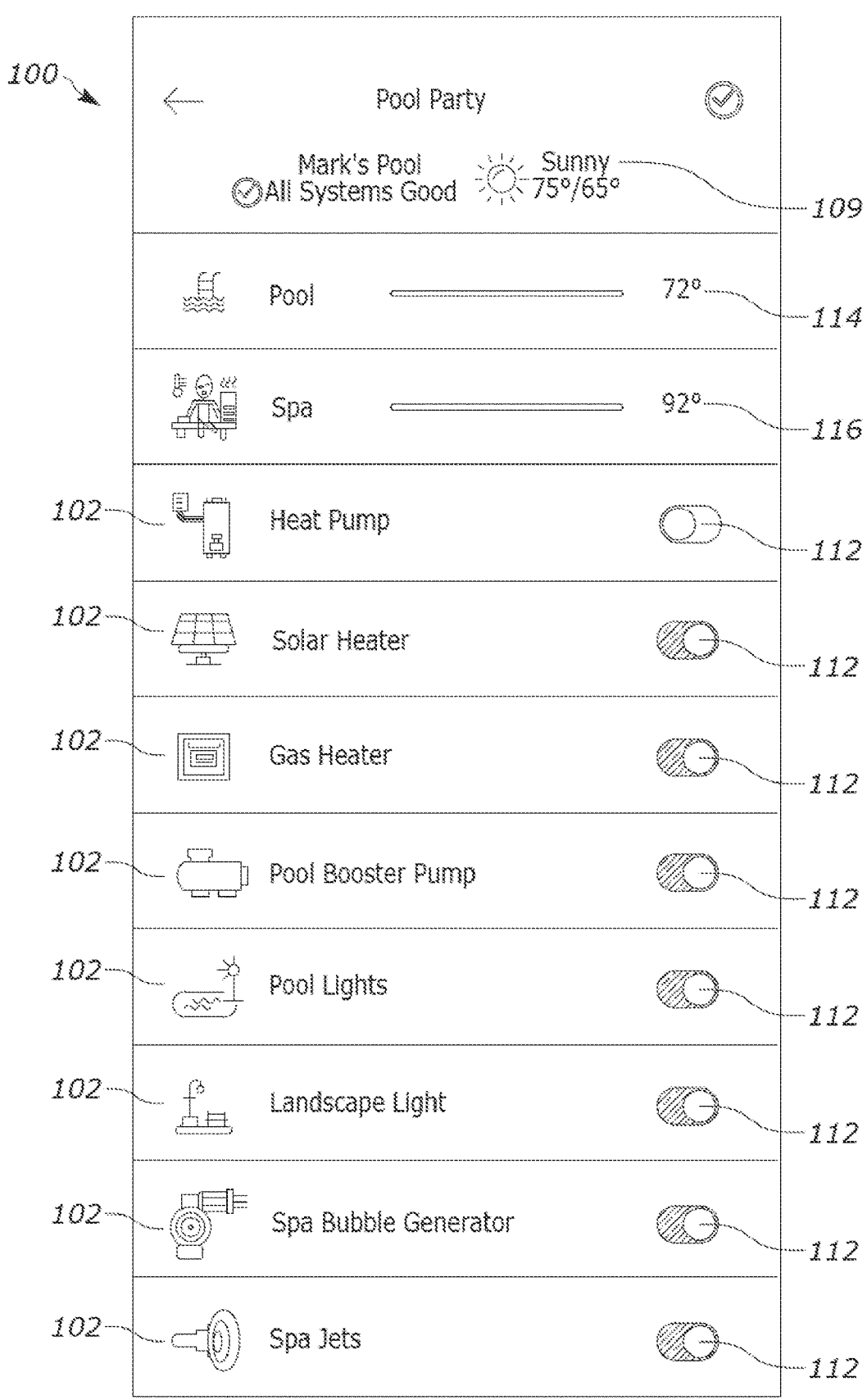

With respect to FIG. 2A, a user may create a user account and log in to their user account via a log-in page 110 of the app 100. The user may access their user account by entering a username or email address and a password associated with the user account. Once the user has created the user account, the user may acid and associate pool/spa equipment 102 of their pool/spa system with their user account. The user may also customize the appearance of the app 100 for their user account, for example, by uploading an image of their own pool and/or spa to be displayed as the image 107 on the homescreen of the app 100 (see FIG. 1). As shown in FIGS. 3A-3C, various types of pool/spa equipment 102 are shown that have been associated with a user account in the app. In one form, the user configures the pool/spa equipment 102 to be connected to the Wi-Fi network at the pool/spa (e.g., a user's home Wi-Fi network). With respect to FIG. 2B, the user may connect their user device 104 to that Wi-Fi network to search for pool/spa equipment on the Wi-Fi network and select to add or associate the pool/spa equipment 102 with the user account in the app 100. The user may be required to enter the network name and an associated password to access the Wi-Fi network.

Once the user has associated a device of the pool/spa equipment 102 with their user account within the app 100, the app 100 and/or the associated server computer 106 communicates with the pool/spa device to identify information about the device. For example, the app 100/server computer 106 may determine the type of device (e.g., pump, bubble generator, heater), manufacturer, application programming interface (API) for communication with each device, which parameters of each device may be controlled (e.g. turn device on/off, adjust a speed or temperature, dim lights, etc.), and what data each pool/spa equipment device collects. The server computer 106 is thus able to communicate with various types of pool/spa equipment that are sold and/or manufactured by a variety of manufacturers, brands, and/or suppliers. This enables a user to control all of their network-enabled pool/spa equipment from a single application regardless of the brand manufacturer, vendor, supplier, etc. of the pool/spa equipment 102 and regardless of whether the user's pool/spa system is comprised of pool/spa equipment 102 from a variety of brand, manufacturer, vendor, supplier, etc. The pool/spa equipment 102 communicate data collected to the server computer 106 via the network 108. For example, a pump may communicate its operation setting (e.g., on/off, speed), energy usage, health data. As another example, a heater may communicate its operation setting (e.g., on/off) temperature of the fluid (e.g., in the spa, pool), temperature setting (e.g., desired temperature), energy usage, etc.

Figure 4A:
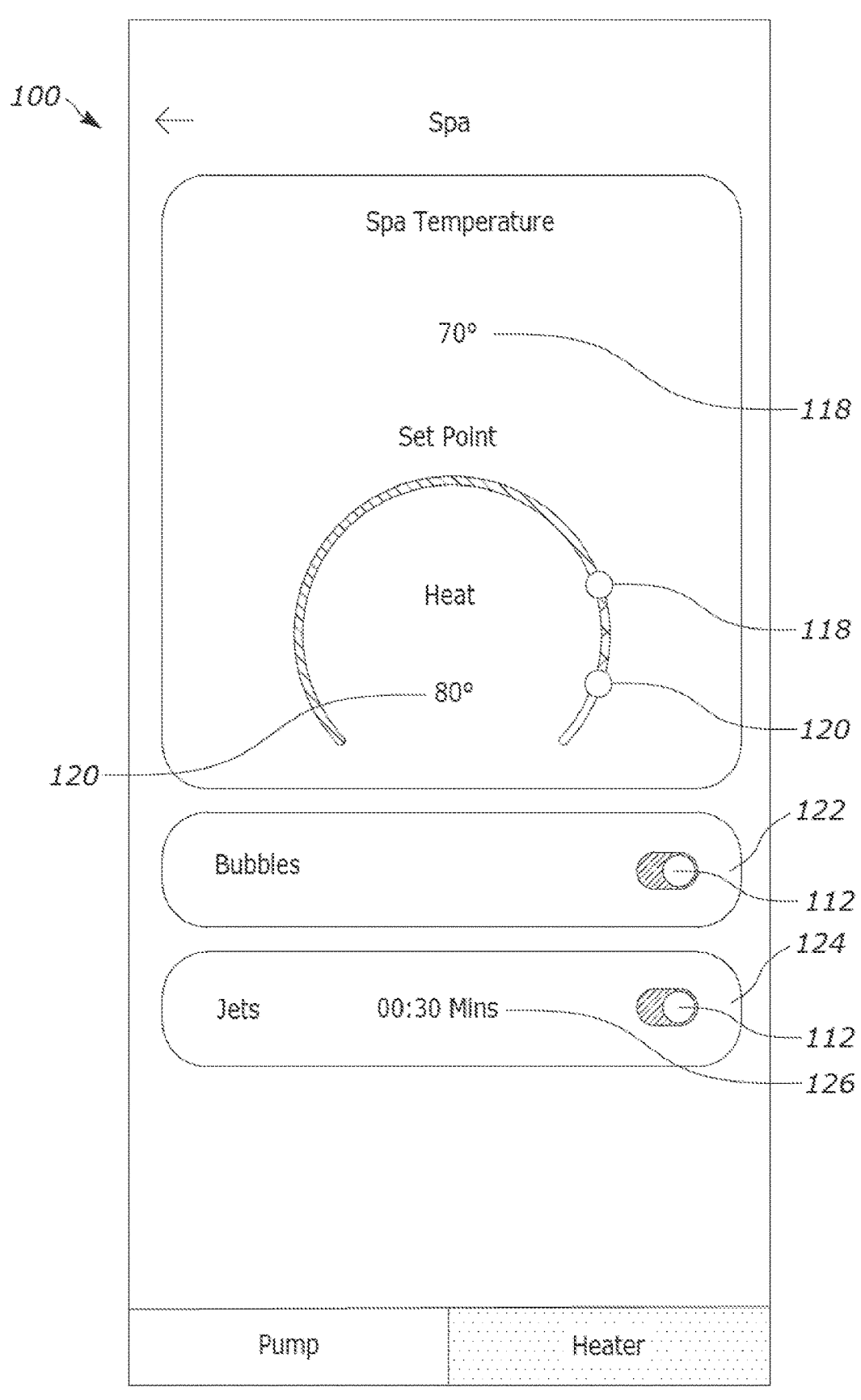
FIG. 4A is a screenshot of an example page of the smartphone application of FIG. 1 for monitoring and controlling equipment associated with a spa.

The server computer 106 may present the pool/spa equipment 102 and data associated with each device within the app 100. With reference again to FIG. 1, the app may display an indication 103 of the energy usage of the pool/spa system and an indication 105 of the fluid movement through the pool/spa system (e.g. through a pump or filter). The app 100 may also include a graphic 109 of the current weather conditions, the high temperature for the day, and the low temperature for the day. With respect to FIGS. 3A-3C, the user may view the pool/spa equipment 102 associated with their user account in the app 100. The app 100 also includes a virtual toggle switch 112 for each pool/spa equipment 102 device that indicates whether the device is running. The user can select to turn each device on individually by selecting the toggle switch or swiping on the virtual toggle switch 112 on the display of the user device 104. With respect to FIG. 3C, the app 100 also includes a temperature indicator 114 indicating the temperature of a pool associated with the user account and a temperature indicator 116 indicating the current temperature of a spa associated with the user account. As explained in further detail below, the app 100 permits the user to adjust various parameters of the pool/spa equipment 100 including powering a device of the pool/spa equipment 102 on/off, adjusting network connectivity, adjusting the energy efficiency, changing between pool, spa or other modes, adjusting the temperature or the pool and/or spa, adjusting the fluid hardness (or total hardness), adjusting the chlorine or bromine level, adjusting the free chlorine or bromine level, adjusting the pH level, adjusting the fluid alkalinity (or total alkalinity), adjusting the fluid stabilizer level, adjusting the fluid salinity, adjusting the fluid acidity, adjusting the fluid pump speed, The app 100 may further allow the user to monitor and control the pool and spa separately within the app 100. For example, with respect to FIG. 4A, a screen of the app 100 is shown that includes equipment 102 associated with the spa and data collected by that equipment 102. As shown, the app 100 displays the current temperature 118 of the spa, the set or desired temperature 120 of the spa, a display indicator 122 of whether the bubble generator is on, and a display 124 of whether the jets are on. The app 100 may also display an indication 126 of how long the jets are scheduled to remain on before automatically shutting off. The user may adjust the set point for the spa by selecting the set temperature 120 or by dragging the set point indicated on the graphic. The user may also turn the spa equipment 102 on or off by toggling the toggle switch 112 associated with the spa equipment 102. When the user turns a pool/spa equipment device on or off or adjusts a setting of the device, the app 100 communicates the control signal to the server computer 106 via the network 108. The server computer 106 may communicate with the pool/spa equipment 102 to turn on/off the device or to implement the setting adjustment made by the user within the app 100. The app 100 may similarly include a display screen permitting a user to view all pool equipment 102 and data associated with the pool and enable the user to view the current pool settings and adjust the operation of the pool 102. For pool/spa equipment devices that can be variably controlled, the user may select the device 102 within the app and adjust the variable parameter. For example, the user may select a variable speed pump within the app and adjust the speed of the pump. For instance, the user may tap a + or − icon within the app 100 to adjust the speed. In another form, the app 100 may present the user with a graphic enabling the user to slide a set point indicator up or down to adjust the current settings of that pool/spa device 102.

Figure 4B:
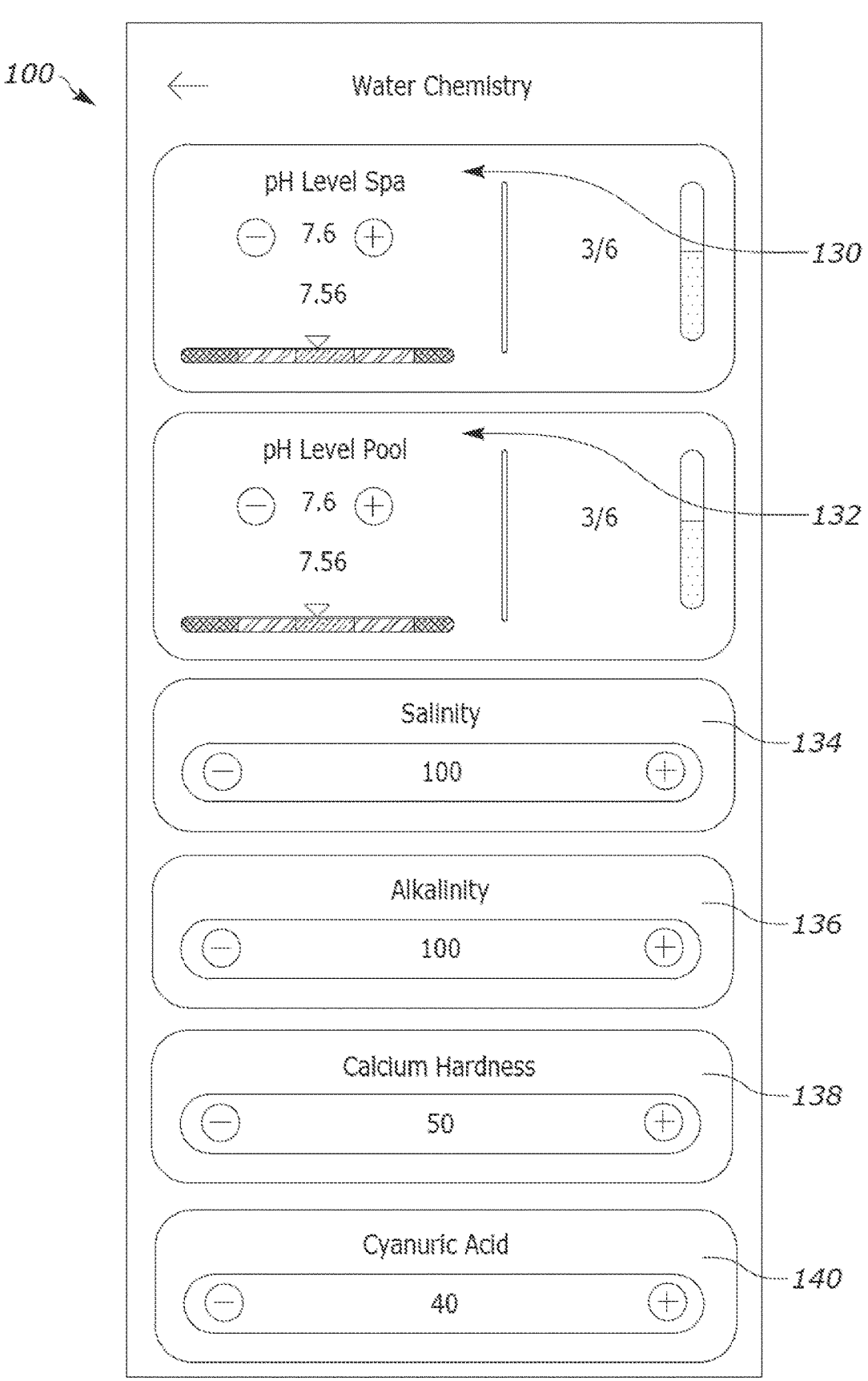
FIG. 4B is a screenshot of an example page of the smartphone application of FIG. 1 for monitoring the water chemistry of a spa and/or pool.

With respect to FIG. 4B, the app 100 further includes a display screen that indicates the current water chemistry as measured by a chemical control device of the pool/spa equipment 102. As shown, the app 100 may display a graphic or data 130 showing the pH level of the spa, a graphic or data 132 showing the pH level of the pool, a graphic or data 134 showing the salinity of the pool/spa, a graphic or data 136 showing the alkalinity of the pool/spa, a graphic or data 138 showing the calcium hardness of the pool/spa, a graphic or data 140 showing the cyanuric acid of the pool/spa. In some forms, the app 100 may further display other aspects of the chemistry of the pool including, as examples, the amount of free chlorine, total chlorine, and stabilizer. The user may set the desired chemical parameters for the pool using the app 100. The app 100 communicates the desired chemical parameters to the chemical control device of the pool/spa equipment (e.g., via the network 108 and server computer 106). The chemical control device may then dispense chemicals as needed to maintain the chemistry of the pool/spa at the desired settings.

Figure 5A:
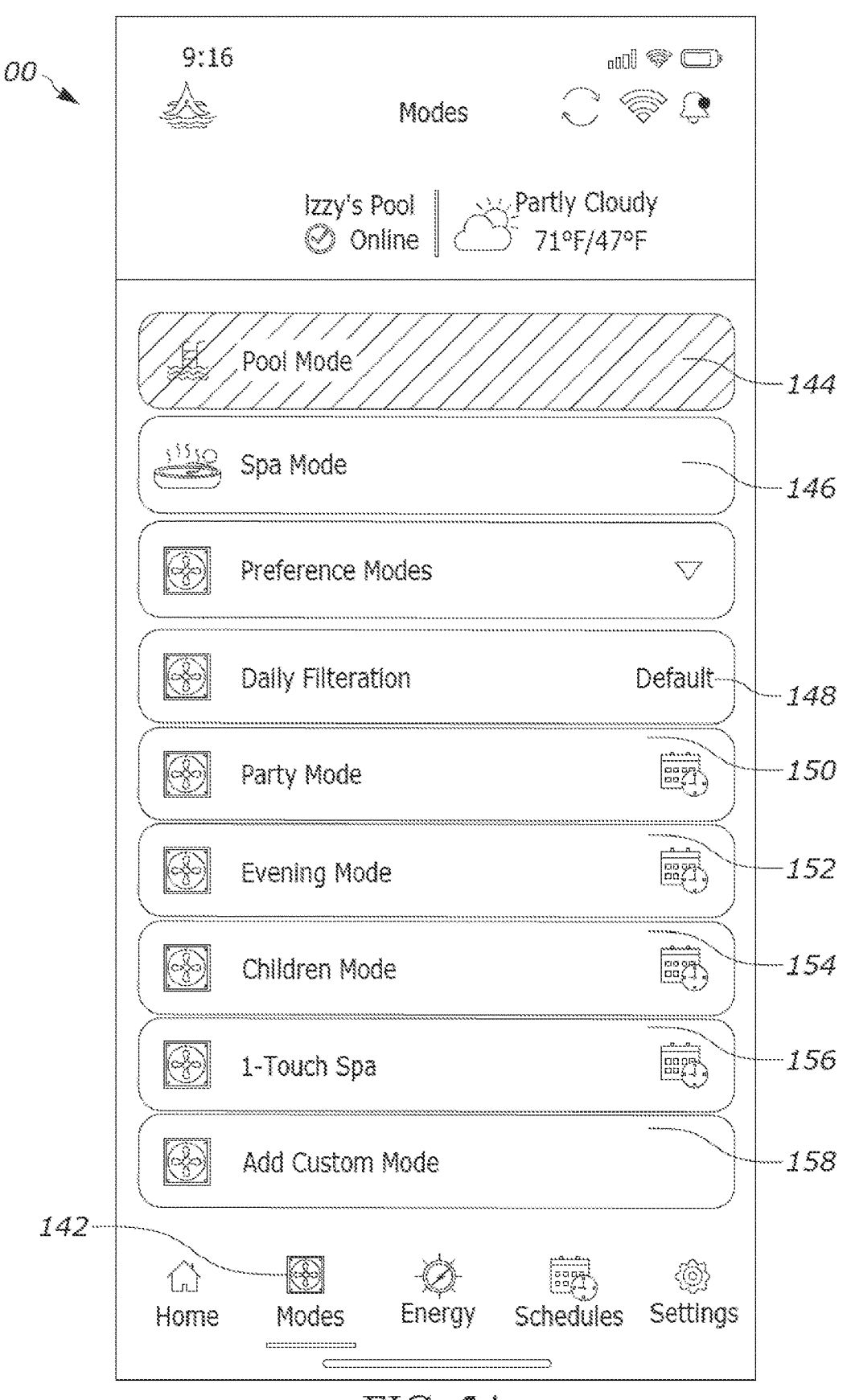
Figure 7:
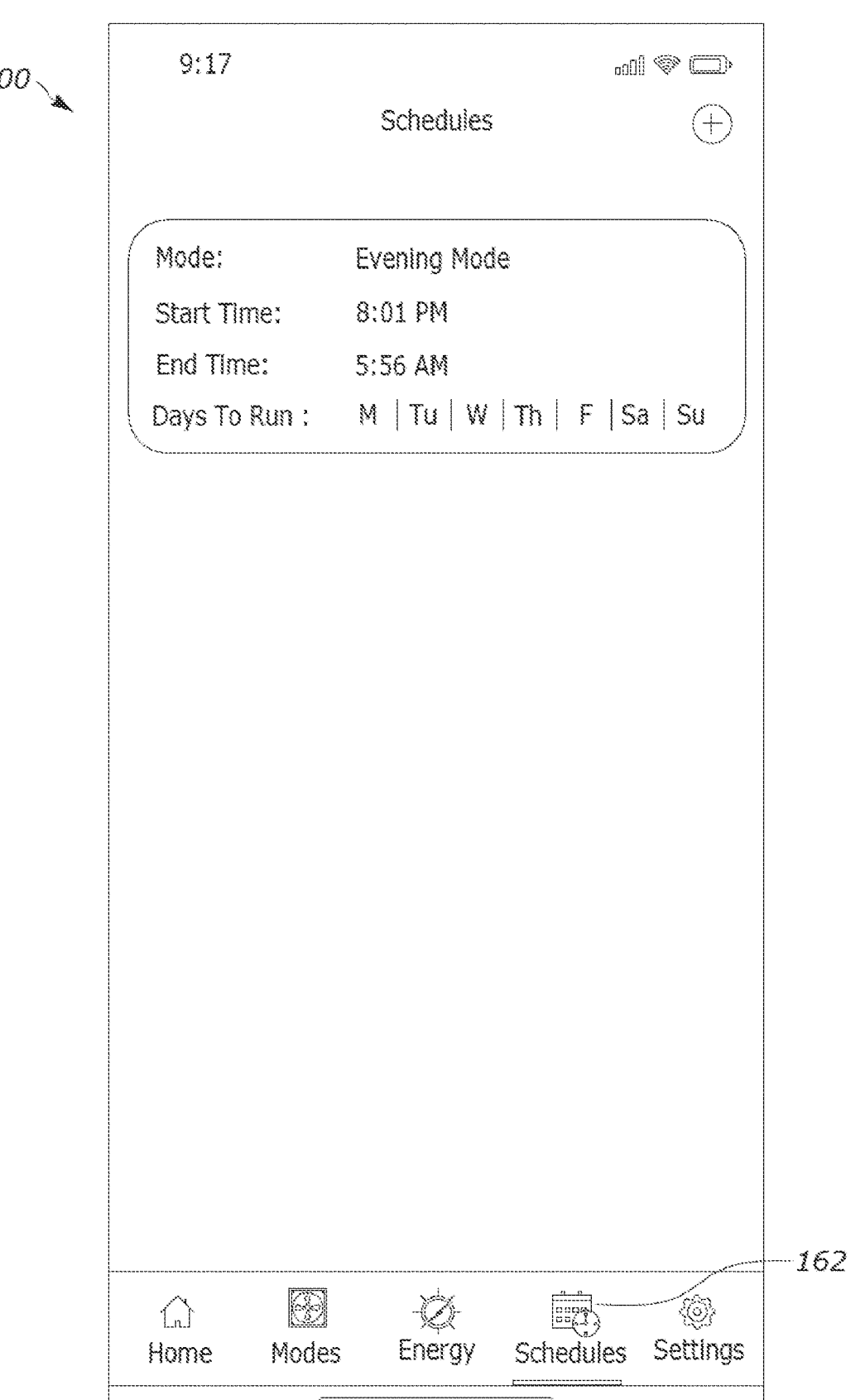
FIG. 7 is a screenshot of an example page of the smartphone application of FIG. 1 for programming a schedule for the pool and/or spa system.

With respect to FIG. 5A-B, the app 100 permits the user to select various modes of operation in the modes tab 142. Each mode may be associated with a plurality of parameter settings for the pool equipment 102, for example, a lighting setting, a temperature setting, a filtration setting, efficiency, etc. As shown, the user may select the pool mode button 144 or the spa mode button 146 to select the mode of the pool/spa system. The spa mode may include different settings than the pool mode, for example, in the spa mode the temperature of the spa may be increased compared to that in the pool mode. The system 101 may be configured to exit the spa mode after period of time to reduce the energy consumption of the system 101. The app 100 may further include other modes selectable by the user that are associated with various settings of the pool/spa system. As shown, the app 100 includes a daily filtration mode button 148, a party mode button 150, an evening mode button 152, a children mode button 154, a 1-Touch spa mode button 156, and provides a button 158 enabling the user to create their own custom mode. When the user selects a mode, the system 101 automatically adjusts one or more parameters of the pool/spa to parameters associated with the selected spa setting. For example, when the user selects the party mode or the evening mode, the system 101 may turn on a lighting setting for the lights of the pool/spa (e.g., turn the lights on, turn on lights of various colors, flashing or strobing patterns). When the user selects the daily filtration mode, the system 101 may run the pool pump to filter the water. With respect to FIG. 5B, the user may select to enter a freeze protection mode that the system 101 enters when the temperature of the pool, spa, or equipment falls below a certain temperature (e.g., 32 degrees Fahrenheit).

The app 100 may include several efficiency modes of operation that the user may select. In an economy mode, the app 100 may set the parameters of the pool/spa equipment to a setting that consumes a lower or the least amount of power and/or reduce the cost of the energy consumed. The app 100 may have active modes that are less energy efficient, such as a mode to quickly heat the spa to a desired temperature even if doing so consumes more energy and/costs more. The active modes may run the pool/spa equipment 102 to carry out a function (e.g., heating the pool, filtering the pool, etc.) when the user desires to use the pool or selects an active mode in the app 100. In some forms, the system 101 may default to or return to a lower energy efficient mode after a certain time period or when the system 101 determines the pool/spa system is no longer in user. For instance, if the user selected the spa mode in the app 100 and has not adjusted any other parameters or selected another mode within a certain period of time (e.g., 4 hours), the app 100 may switch to a more energy efficient mode. In another example, the system may be configured to reset to the energy efficiency setting after a period of time (e.g., such as after the spa jets have shut off (e.g., 15 or 20 minutes), or such as after a predetermined amount of time has passed after the pool or spa features have been activated or after a predetermined amount of time after the pool or spa features have deactivated). It should be understood that features can include the jet generators, bubbler generators, blowers, etc., but may also include other items such as waterfalls, light displays, fountain displays, automated electronic devices such as raising or lowering televisions, etc.

The system 101 collects energy consumption data for the pool/spa equipment 102. With respect to FIG. 6, the user may view the energy usage of their pool/spa equipment within the app 100 under the energy tab 160. As shown, the user can view the amount of energy consumed by the pool/spa equipment over a period of time (e.g., that day, the past 24 hours, the past week, the past month, annually, life-to-date, etc.) along with the cost of the energy consumed over any one of those same periods of time. As shown, the energy usage of the pool/spa equipment is shown for each month. This permits the user to track and monitor how much energy the pool/spa equipment is using and how much money the user is spending on their pool/spa system per month. The app 100 may further allow the user to view how much energy each device of the pool/spa equipment is using which may allow the user to see which devices are inefficient and may need to be replaced with new or more efficient equipment. The app 100 may allow the user to view the current or live energy usage of the pool/spa equipment 102 individually or as a whole pool/spa system. The system 101 may include an artificial intelligence or machine learning algorithm that monitors the data collected from the pool/spa equipment 102. The system 101 may learn from the data and determine how the user may run their pool/spa equipment 102 more efficiently. The system 101 may provide the user with notifications, alerts, or suggestions in an email or through the app for how the user may improve the efficiency of their pool/spa system, In some forms, a person detector (e.g., camera, infra-red or other heat sensor, etc.) may be used to detect presence of users and keep the system equipment operating as selected, but then transition the system to a more eco friendly (e.g., efficient) operation when the presence of users is not detected or not detected over any period of time mentioned previously herein.

The app 100 may include a schedules tab 162 that enables a user to program the pool/spa to enter various modes according to a schedule. For example, the user may schedule the pool/spa to enter the evening mode setting starting at 8:01 PM and end at 5:56 AM every day of the week. The evening mode may shut off the lights of the pool during the night and may run a filtration cycle when energy is cheaper. The user may schedule their pool/spa system to enter the spa mode using the app for times when the user anticipates using the spa so that the temperature of the spa is increased at times desired by the user.

Figure 8:
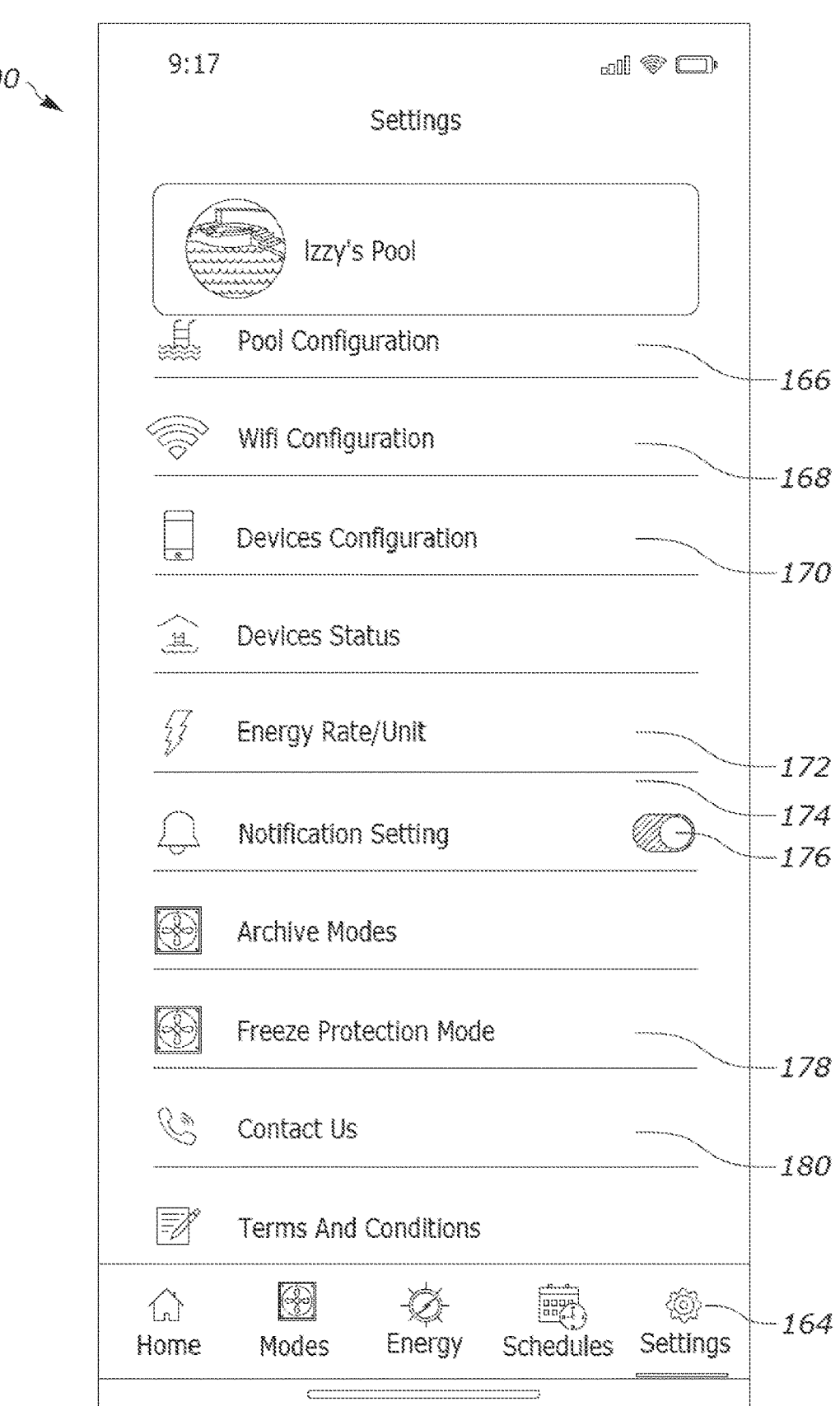
FIG. 8 is screenshot of an example settings page of the smartphone application of FIG. 1.

The app 100 may further include a settings tab 164 as shown in FIG. 8 with various pages the user can select to monitor and/or adjust various settings of their pool/spa system. By selecting the Pool Configuration button 166, the user may view the current settings for the pool/spa system, see which pool/spa equipment 102 devices are currently turned on, and make adjustments to the pool/spa system. The WiFi Configuration button 168 may open a page where the user is able to view the Wi-Fi network the user device 104 is connected to, to see the Wi-Fi network the pool/spa equipment 102 are connected to and to adjust or change the WiFi network settings (e.g., login to the network).

Figure 9:
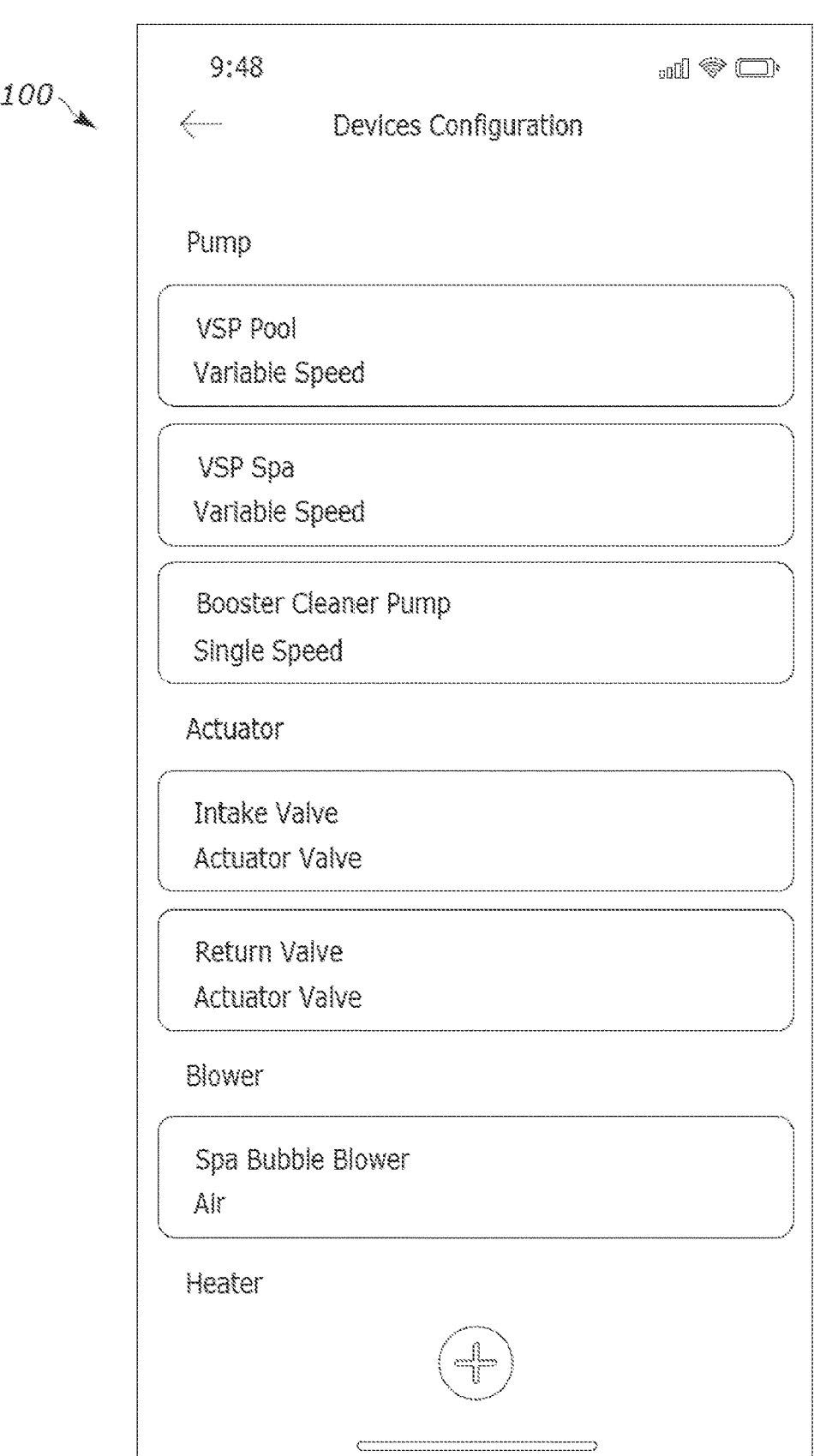
FIG. 9 is a screenshot of an example page the smartphone application of FIG. 1 for monitoring and adjusting pool and spa equipment configuration settings.
Figure 10:
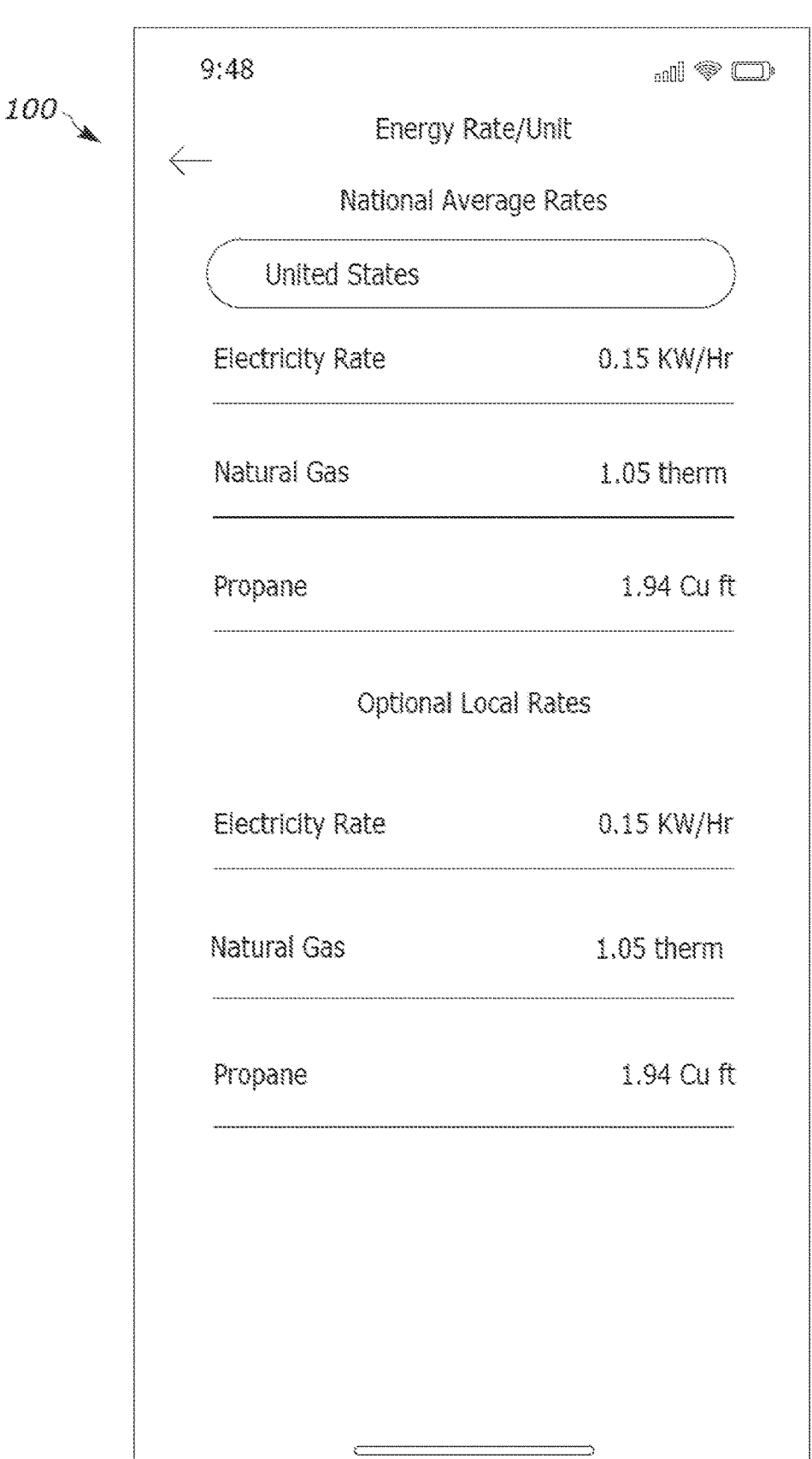
FIG. 10 is a screenshot of an example page of the smartphone application of FIG. 10 displaying energy cost data.

The Devices Configuration button 170 may open a page shown in FIG. 9 that includes a list of all of the pool/spa equipment 102 devices the user has added or associated with their user account. The user may access this page to add new devices to their user account for monitoring and control within the app. The Energy Rate/Unit button 172 may open a page as shown in FIG. 10 showing the current costs of energy such as electricity, natural gas, and propane. As shown, the page displays both the national average rates as well as the local rates so that the user may compare and analyze the cost of the energy required to operate their pool/spa system.

The Notification Settings button 174 includes a toggle switch 176 that the user can toggle on or off to indicate whether they desire to receive notifications about their pool/spa system. The user may select the Notifications Settings button 174 to access a page within the application where the user is able to select what events the user would like to be notified of. The app 100 may be configured to notify the user when a pool/spa equipment 102 device fails or is failing. As another example, the app may notify the user when their pool filter needs to be replaced. As yet another example, the app may notify the user of the energy cost to the user for running the pool/spa equipment for the previous month.

The Freeze Protection Mode button 178 may open the page shown in FIG. 5B where the user may select or adjusts settings for the pool/spa monitoring system when freezing temperatures are detected. By turning on the Freeze Protection Mode, the system 101 may ensure that the pool/spa and/or pool equipment 102 do not fall below temperatures at which damage is likely to occur. For example, the system 101 may operate the pool filtration pump to circulate water. Circulating water through the pipes of the pool/spa equipment 102 may inhibit the water in the pipes from freezing and potentially damaging the pool/spa equipment. As another example, the system 101 may turn on a heater of the pool/spa equipment 102 to maintain the temperature of the water above freezing.

Figure 11:
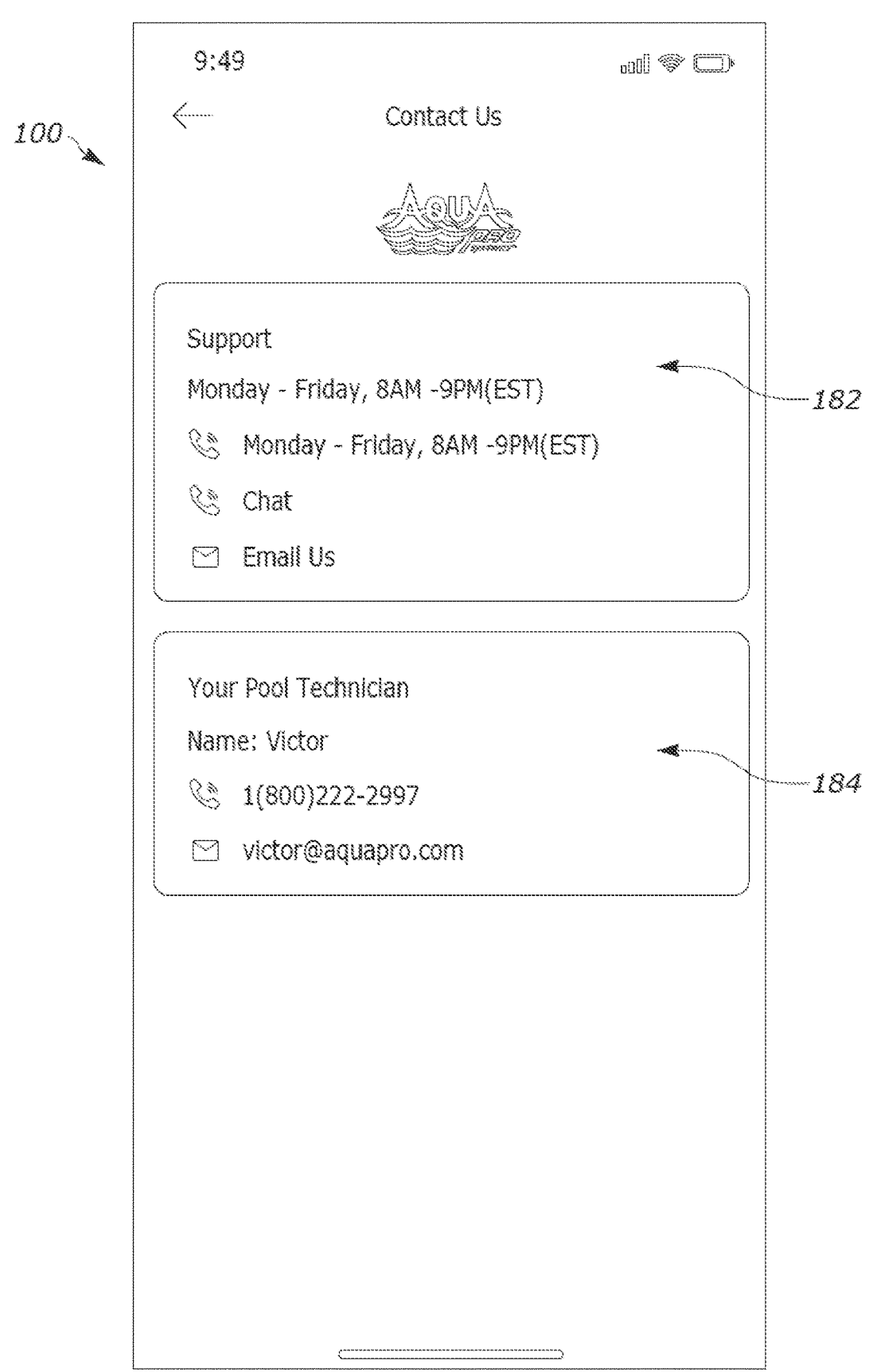
FIG. 11 is a screenshot of an example page of the smartphone application of FIG. 1 including information for support for the pool and/or spa system.

The Contact Us button 180 may open a page with contact information such as that shown in FIG. 11. The page may include support contact information 182 that user may use to ask questions about their system 101 or when they have problems with their system 101. The user may click the support button to have their problem emailed to a customer support service. The support service may log the problem and provide the user with help and support. This page may also include the technician contact information 184 for the user's pool technician or may include the contact information of a local pool technician to recommend to the user.

Figure 12:
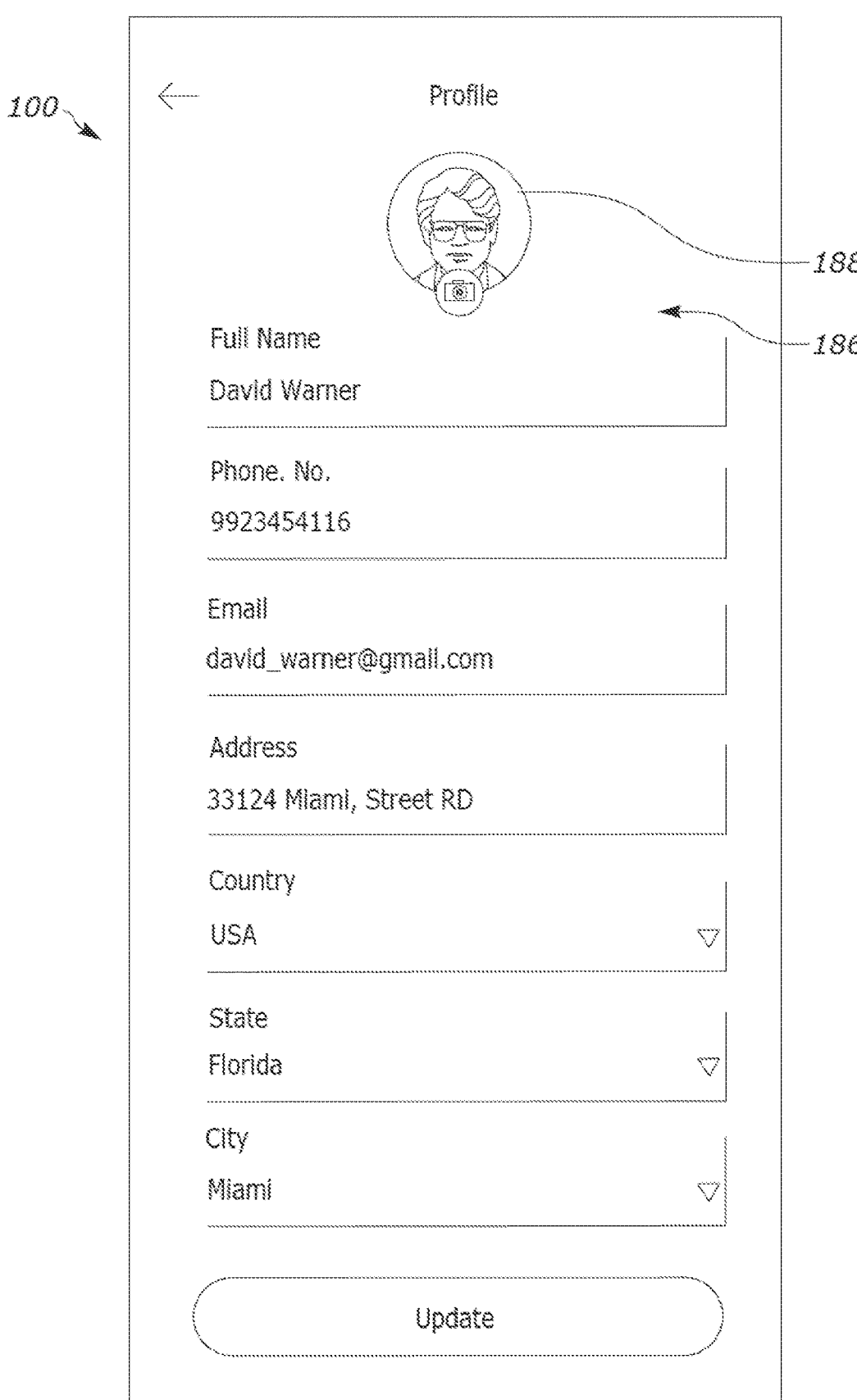
FIG. 12 is a screenshot of a profile of the user account of the smartphone application of FIG. 1.

With respect to FIG. 12, the app 101 may include a user profile 186 associated with each user for a user account. For example, the app 101 may request the user create a user profile when they sign up for the app. The user profile 186 may include a picture 188 that the user may upload. The user profile 186 may also include information such as the user's name, their phone number, email address, street address, country, state, and city.

Figure 13:
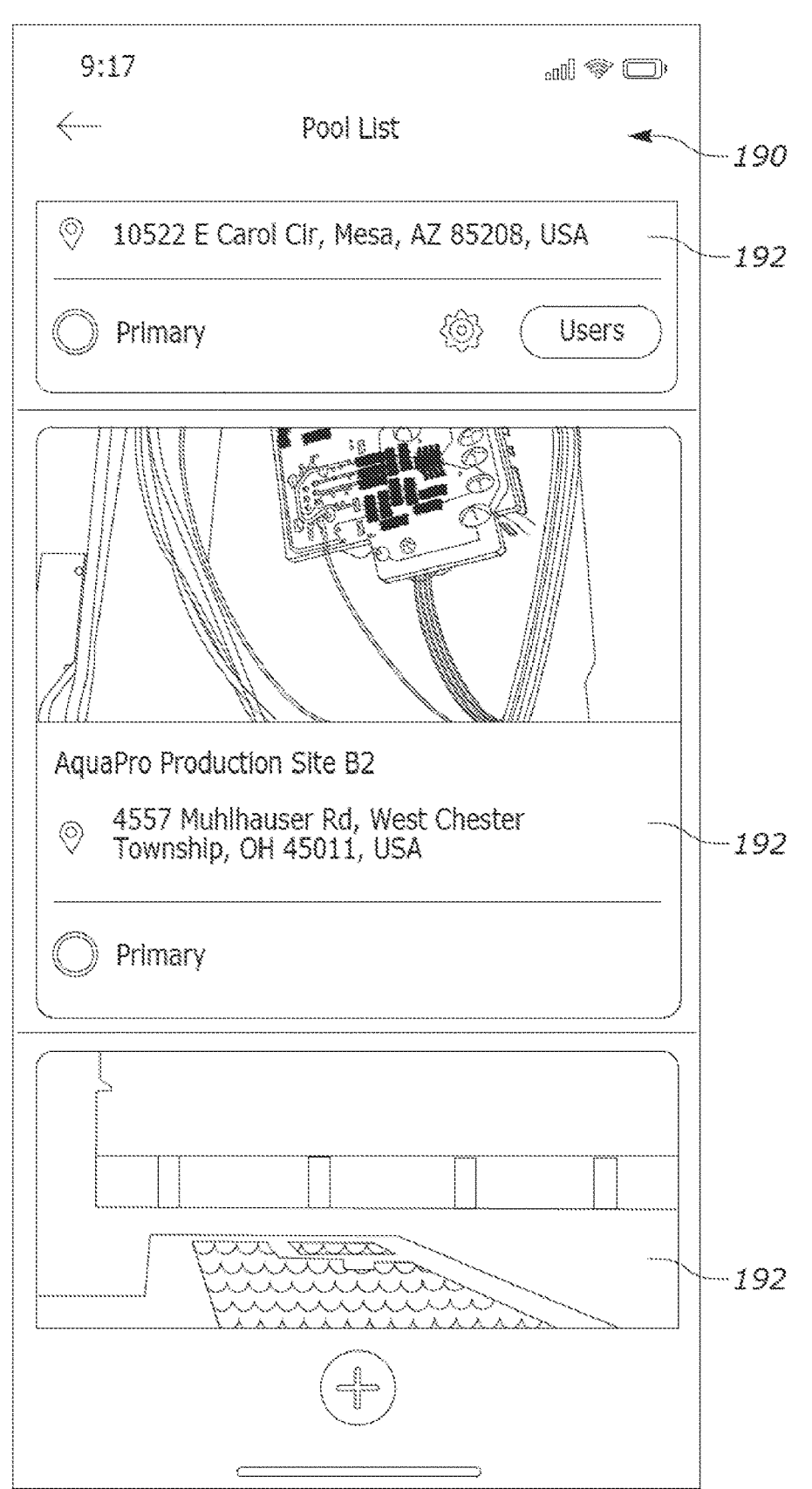
FIG. 13 is a screenshot of an example page of the smartphone application of FIG. 1 illustrating several pool and spa systems associated with the user account.

The app 101 may allow a user to associate more than one pool/spa system with their user account. For example, if a user has two home and each have a pool and/or spa, the user may create two pool/spa systems within the app 101 and associate the pool/spa equipment 102 with the appropriate pool/spa entry within the app 101. With respect to FIG. 13, the app 101 displays a page with a pool list 190 including an entry 192 for each pool/spa the user has associated with their account. The user may select a pool/spa entry to view the current settings and adjust or control the selected pool/spa system.

A pool technician may create a user account and associate their client's pool/spa systems with their user account. This enables the pool technician to remotely monitor their client's pool/spa systems and remotely make adjustments to maintain or improve the performance of the pool/spa system. The pool technician may use the Notifications Settings button 174 to program the app 100 to provide them with notifications or alerts when a problem is detected with one of their client's pool/spa systems. The app 100 may permit remote support staff or technicians to view the user's pool/spa equipment 102 associated with their user account which may aid in troubleshooting issues with the user's equipment as the support is able to remotely view all aspects of the user's pool/spa system. The app 100 may permit the support staff or technician to remotely adjust one or more settings or parameters of the user's pool/spa system which may aid in more quickly resolving issues with the user's pool/spa system. The app 100 may permit the support staff or technician to send the user coupons for new equipment, for example, when the support staff determines a component of the user's system has failed. The app 100 may also monitor the health of the pool/spa equipment 102 and send the user coupons and recommendations for new equipment to purchase when a health problem is detected or when a pool/spa equipment device has reached a certain age where the device is likely to fail soon.

Figure 17A:
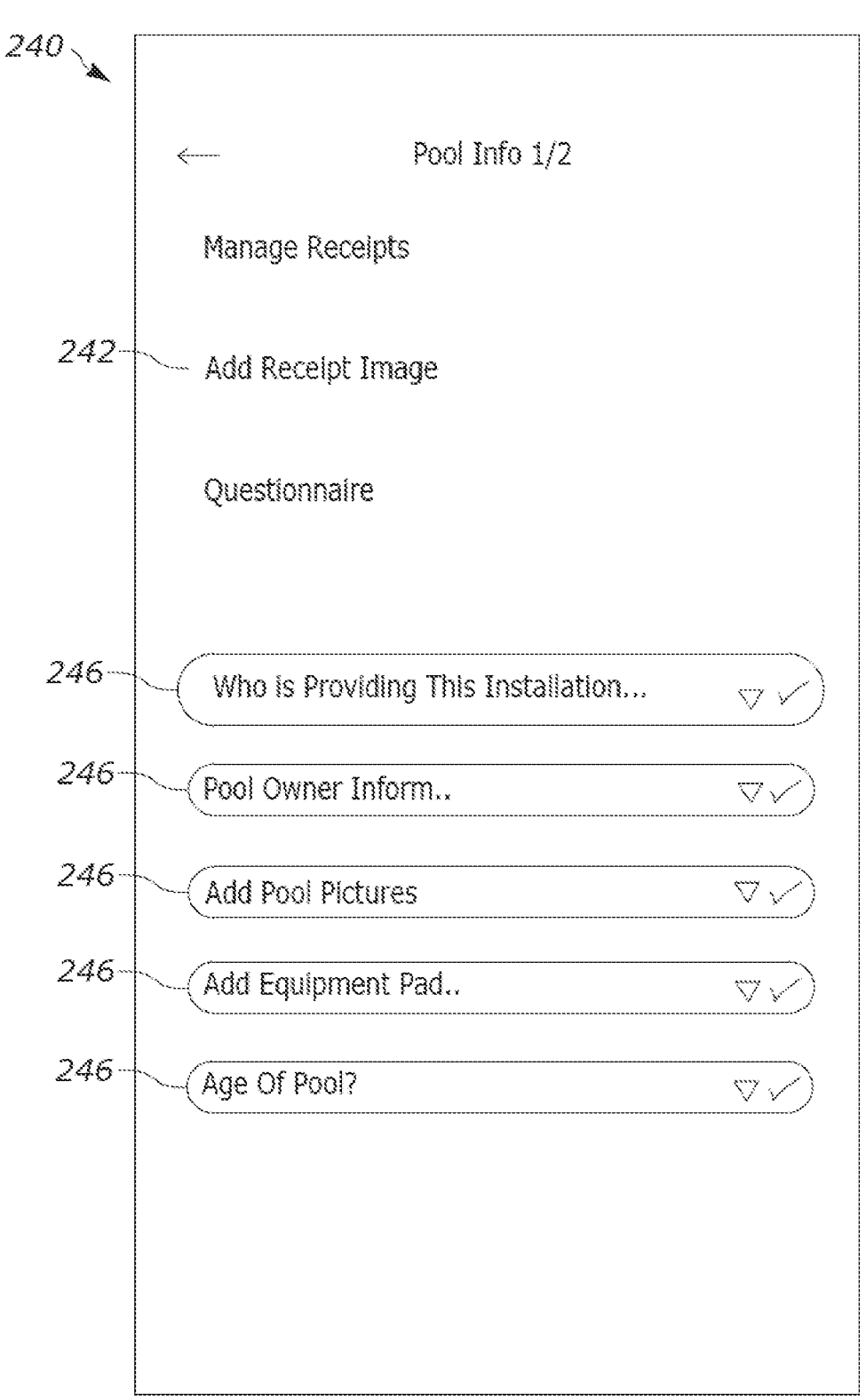
FIGS. 17A-17B are screenshots of examples pages of the smartphone application of FIG. 1 for entering additional information relating to the pool and/or spa system into the smartphone application.
Figure 17B:
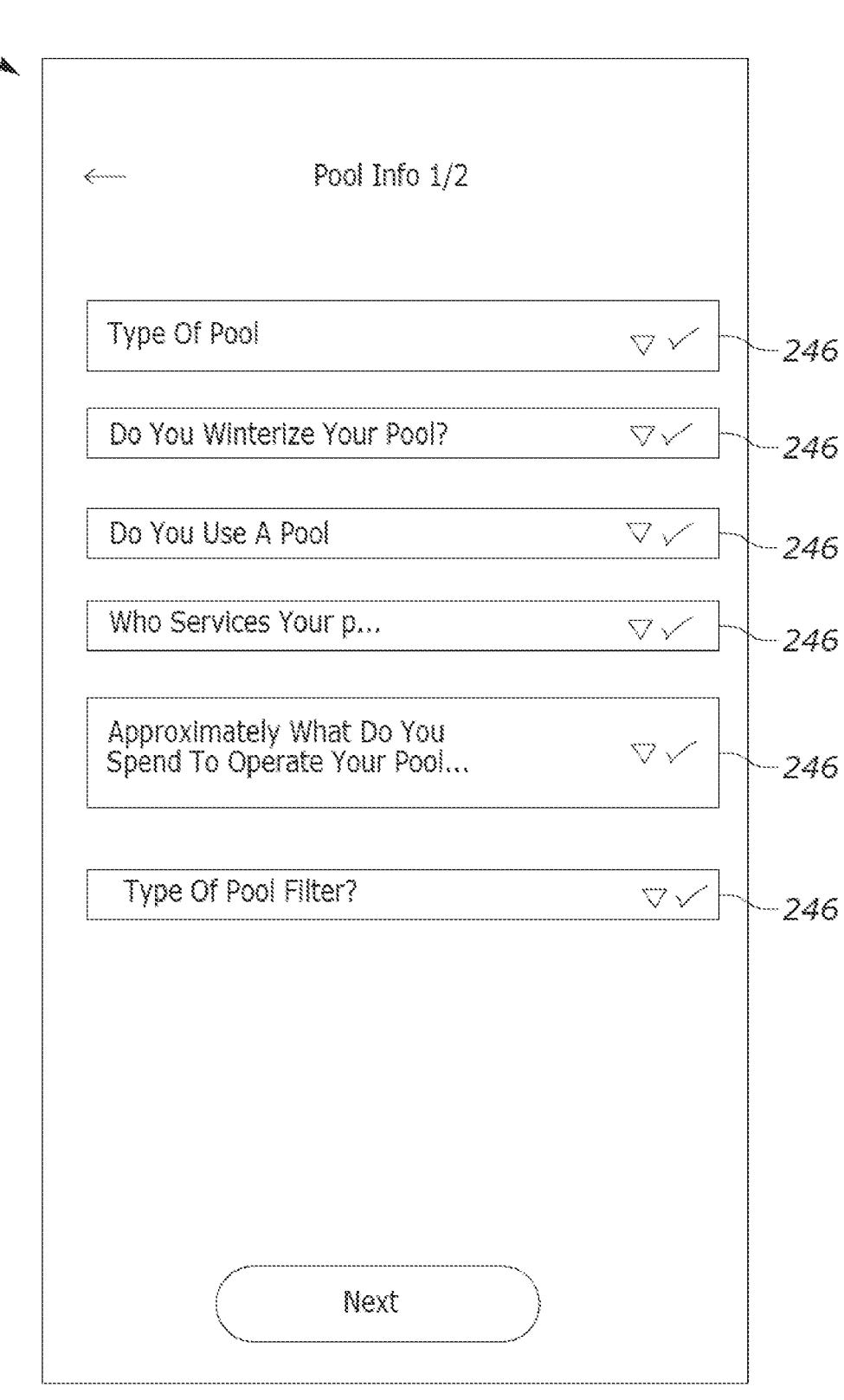

The app 100 may further include a wallet tab or page (see FIG. 17A). The user may use the app to take a picture or upload a picture of each pool/spa equipment 102 device, the receipt for each pool/spa device, and the pool itself. The app 100 may store these images in this digital wallet for later access and use by the user. The user may use these images to provide a remote technician or support staff with an image of their pool/spa equipment 102 when needed, for example, if the technician or support staff is troubleshooting an issue with the user's equipment.

With respect to FIG. 14, the pool/spa equipment 102 may include a power center including a controller 196 at the pool pad (e.g., commonly a cement pad where most if not all pool or spa operating equipment is located such as pumps, heaters, bubblers or bubble generators (e.g., aerators, etc.), filters, jet generators, cleaning controls, chlorinators, etc.). In some forms, the controller 196 is a circuit board that is installed within an existing power center of a pool/spa system. For example, a controller board of the power center may be replaced with the controller 196. The controller 196 is configured to communicate with and interface with the existing pool/spa equipment regardless of the manufacturer/ supplier to enable the pool/spa equipment to be controlled and monitored remotely by a user via the app 100. The controller 196 may be configured to receive Firmware Over-the-Air (FOTA). This enables the firmware of the controller 196 to be updated remotely without needing to send a technician to access and update the device when in the field, e.g., installed at the pool pad of a pool/spa system. This enables coding errors to be corrected remotely and to update the controller 196 after installation to further improve the system 101, for example, to address other market needs that may arise. In a preferred form, the controller 196 may be sold as its own standalone device to be connected to a conventional power center, or it may be sold as a snap in or insertable PCB card that may be placed into a receptacle (e.g., PCB card slot) on conventional power centers, or it may be sold as part of an entire power center and include the additional items that would accompany a power center (e.g., pool equipment breakers, pool equipment display or control panel, timers, etc.).

Figure 15:
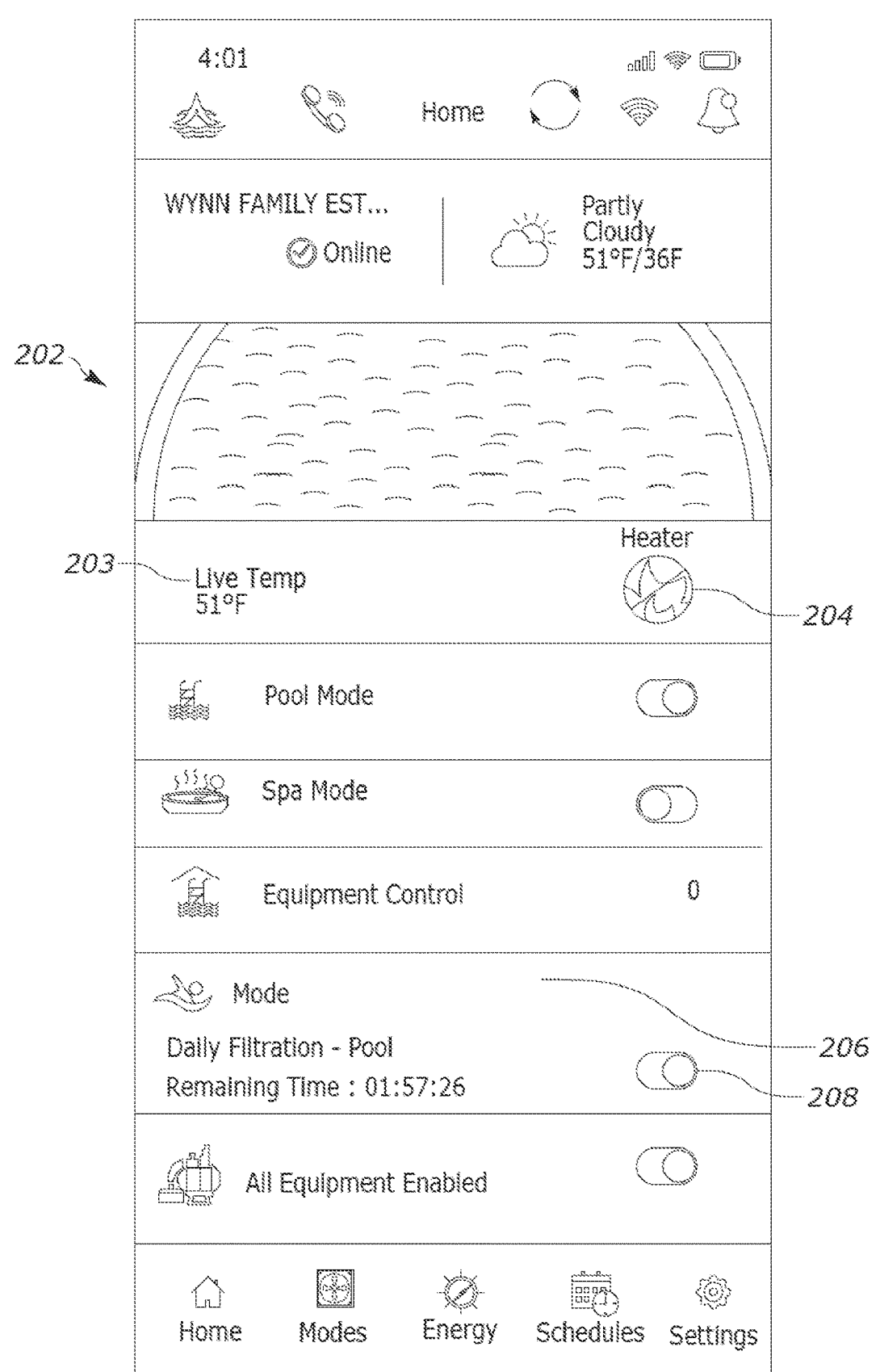
FIG. 15 is a screenshot of an example homepage of the smartphone application of FIG. 1 according to another embodiment.

With respect to FIG. 15, a homepage 202 of the app 100 is provided according to another embodiment for monitoring and controlling the pool/spa equipment 102. The homepage 202 is similar in many respects to the homepage described with respect to FIG. 1 above such that the differences will be highlighted in the following discussion. The homepage 202 provides an indication 203 of the live temperature pool water temperature (e.g., 54° F.). The user may tap on the indication 203 to be brought to a page of the app 100 to adjust the set point temperature of the spa/pool water, for example, to the page shown in FIG. 4A.

Figure 18:
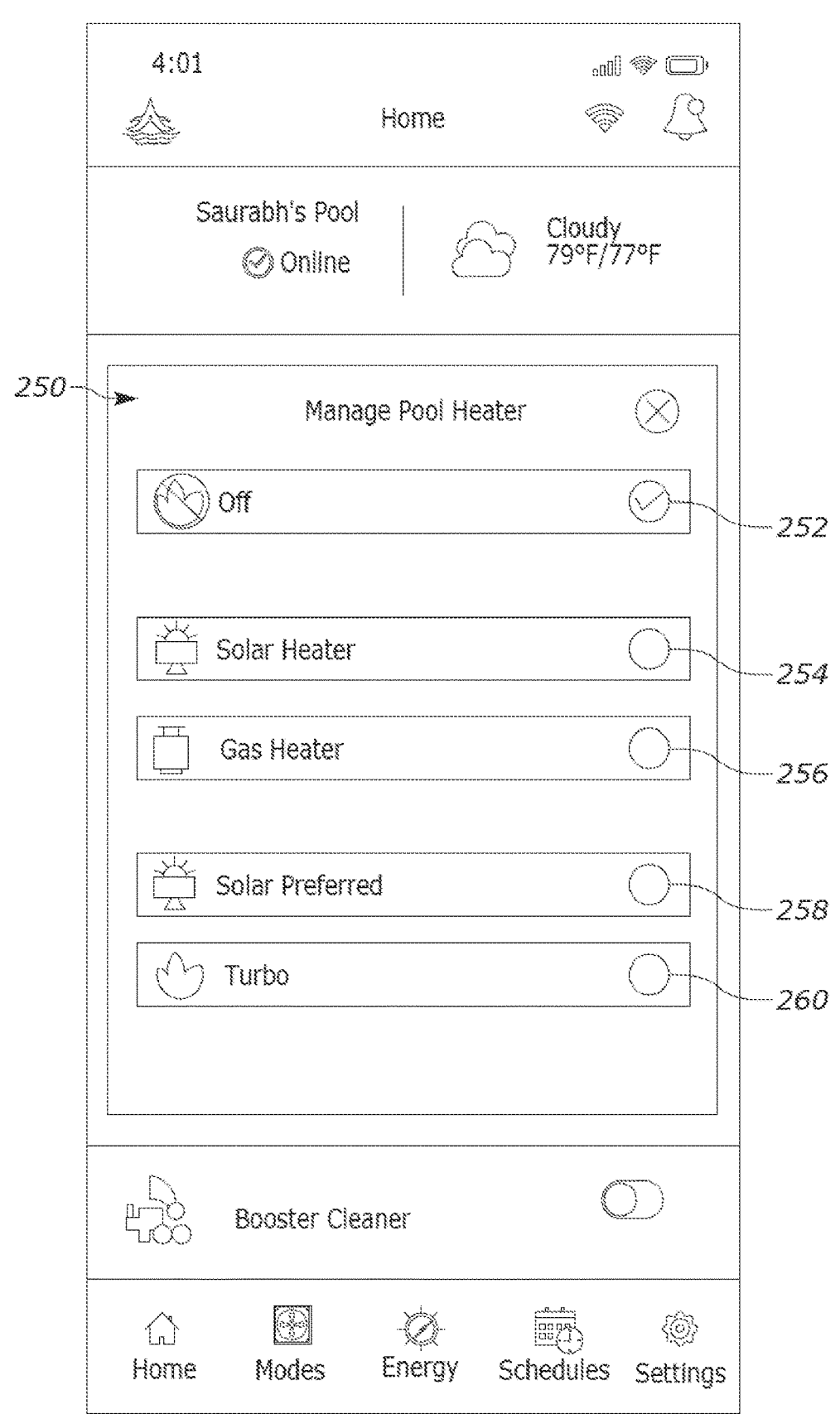
FIG. 18 is a screenshot of an example page of the smartphone application of FIG. 1 for managing the operation of equipment of the pool and/or spa system.

The homepage 202 further includes an icon 204 indicating whether or not a heater of the pool/spa equipment 102 is active. In the example shown, the icon 204 includes a graphic of flames with a circle-backslash symbol overlayed on the flames to indicate the heater is off or not running. When the heater is running, the circle-backslash symbol may be removed from the icon 204. The user may tap on or select the icon 204 to toggle the heater on or off. In some forms, selecting the icon 204 opens a device status page (such as the page of FIG. 3B) where the user is presented with the heater options of the pool/spa system. The user may use the toggle button 112 to turn on a heat source, for example, the gas heater and/or heat pump. With respect to FIG. 18, in some forms, selecting the icon 204 may open a pool heater management window 250 enabling the user to manage the heater settings for the pool. The window 250 may present the user with all of the heating equipment of the pool/spa system that the user may select from to heat the pool/spa. In the example shown, the user has a solar heater and a gas heater. The user may select the "off" option 252 to turn off the heaters of the pool/spa system. The user may select the solar heater option 254 to use the solar heater to heat the pool/spa system. The user may select the gas heater option 256 to use the gas heater to heat the pool/spa system. In the example shown, the window further includes a solar preferred option 258 and a turbo option 260. The user may select the solar preferred option 258 to primarily use the solar heater to heat the pool/spa system and to use the gas heater when needed, for example, when the solar heater is not available. The user may select the turbo option 260 to use both the solar heater and gas heater to heat the pool/spa system to heat the pool quickly.

The homepage 202 further includes a mode button 206 that a user may select to view and/or adjust the mode of operation of the pool and/or spa. Selecting the mode button 206 may bring the user to a page displaying the various modes of operation of the pool, such as that shown in FIG. 5A. The homepage 202 further displays information on the mode button 206 indicating the current mode of the pool and how long the pool will remain in this mode, for example, before changing to another mode. In the example shown, for example, the mode button 206 indicates the pool is in the "daily filtration" mode which will continue to run for about 1 hour and 57 minutes. The mode button 206 further includes a toggle switch 208 that may be used to turn off the current mode of the pool. For example, the user may tap the toggle switch 208 or slide their finger along the toggle switch 208 graphic to turn the mode off or on.

Figure 16C:
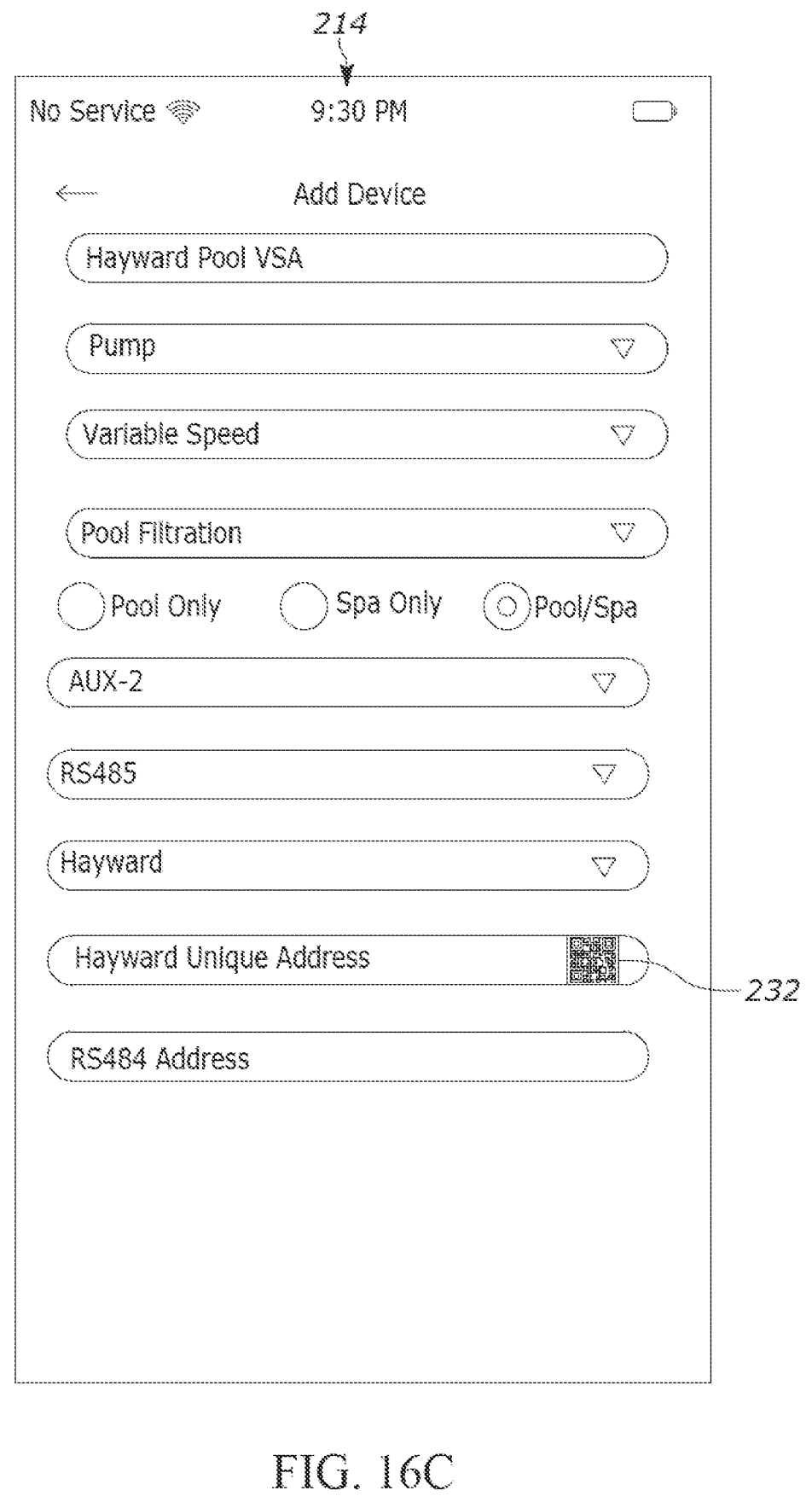
Figure 16D:
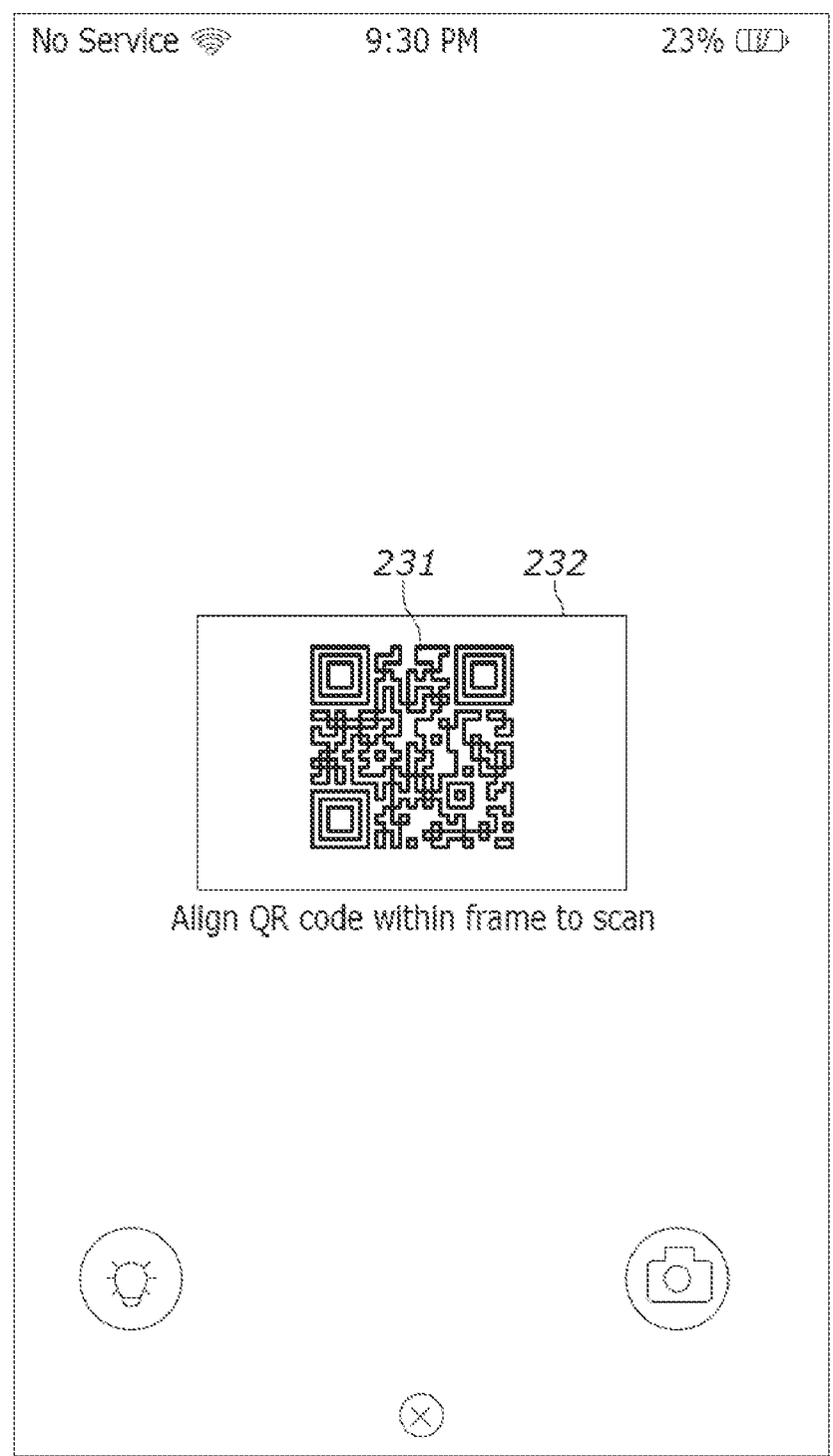

With respect to FIGS. 16A-16F, examples pages of the app 100 are shown for adding pool/spa equipment to a pool system within the app 100. FIG. 16A shows a page 210 for configuring new devices to be added to the user's account or pool system within the app 100. The user may add and configure the devices of the pool/spa equipment when initially setting up their pool/spa system for control via the app 100 and/or when the user replaces or adds a new device to their pool/spa system. In some forms, the app 100 may automatically detect pool equipment to be added within the app 100. For example, where the pool equipment is connected to the same network as other pool equipment that has been added in the app 100, the app 100 may retrieve information about the detected pool equipment (e.g., by communication with the pool equipment over the network) and present the pool equipment on the page 210 for the user to select to add to the pool system within the app 100. The page 210 further includes an add button 212 that the user may select to add a device.

Upon selecting the add button 212 of page 210, the app 100 may present an add device plurality of fields that the user may fill out to input the information about the device. The page 214 may include a text box 216 where the user may enter a name for the device being added. The page 214 further includes drop down menus 218A, 218B, 218C where the user may enter in a device category, device type, and device function, respectively, for the device. The device category drop down menu 218A may present options such as heater, temperature sensor, pump, blower, and actuator that the user may select. The device type drop down menu 218B may present options based on the device category selected. For example, where the device category is a "pump" the device category may be variable speed or single speed. The device function drop down menu 218C may further present options based on the device category selected that the user may select from. Where the device category is a "pump" the device function may be, for example, pool filtration.

The page 214 also presents a field for the user to select whether the device is for the pool only, the spa only, or both the pool/spa. For example, the page 214 includes radio buttons 220 that a user May user to input which of pool/spa the device is associated with. The page 214 further includes input fields for entering the connection type 222, the manufacturer name 224, the model of the device 226, the age of the device 228, and the power consumption 230 of the device. The input fields may be text boxes where the user may type information into each field or drop down menus presenting the user with options to select from. As shown in FIG. 16C, information for adding a variable speed pump for both the pool/spa has been entered.

The page 214 may further include an input field or button that the user may select to scan a code of the device being added. As shown in FIGS. 16C-16E, the page 214 may present a scan icon 232 that the user may select to open their camera of their user device (e.g., smartphone) to scan the code of the device. The code may be a bar code, QR code, or data matrix as examples. Upon selecting the scan icon 232, the app 100 may open the camera of the user device (see FIG. 16D) and prompt the user to align the QR code 231 of the device within a frame 233 in a central portion of the screen. The app 100 may read the code and automatically enter fill in information about the device into one or more fields of the add device page 214. For example, scanning the code may cause the app 100 to read a unique address of the device and fill in the unique address 235 (e.g., MAC address) into the corresponding field of the page 214 as shown in FIG. 16E. The unique address may be stored and associated with the added device. The app 100, controller 196, and/or server computer 106 may communicate with the device and identify communications from the device based on the stored unique identifier.

Figure 16F:
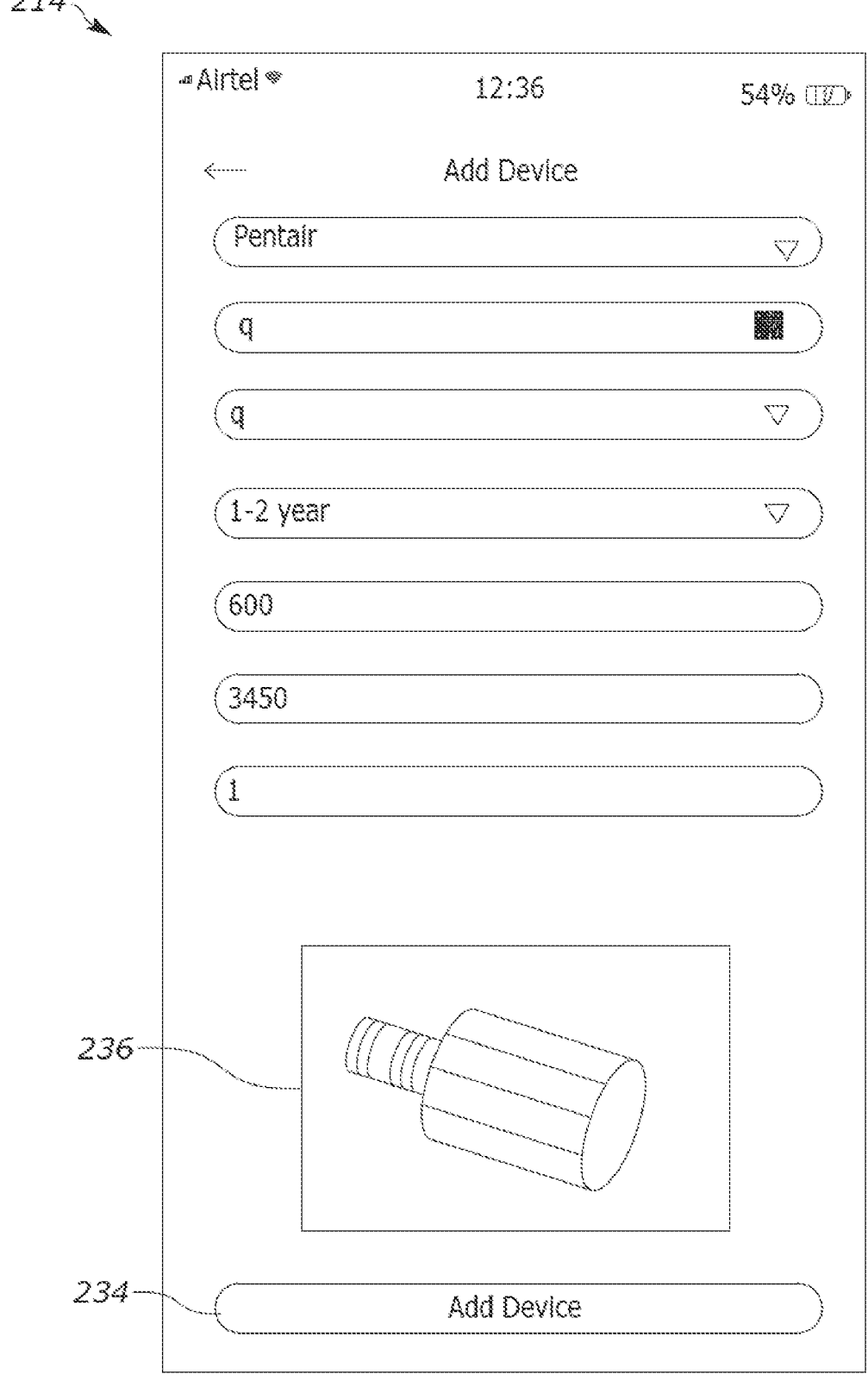

Regarding FIG. 16F, once the user has entered information into all of the required fields of the add device page 214, the user may select the add device button 234 to submit the entered information and add the device. The app 100 then stores the entered information about the device and associates the device with a pool/spa system of the users within the app 100. In some forms, the add device page 214 prompts the user to take a photo 236 of the device. The photo 236 may be stored with the device information and may be presented along with alerts about the device to aid the user in physically identifying the device to which the alert applies. For example, the app 100 may alert the user that a pump is nearing the end of its life and will likely need to be replaced soon. By presenting or allowing the user to view the photo 236, the user is able to verify which physical component needs to be replaced so that the incorrect component is not inadvertently replaced.

The app 100 may also provide the user with a pool information page 240 where the user may enter information about their pool/spa system into the app 100. The pool information page 240 includes a button 242 that the user may select to add receipts for pool equipment to the app 100. For example, upon purchasing a new component for the pool the user may take photo of the receipt for their records. The user may select the button 242 and be prompted to upload an image of the receipt to be stored in the app 100. The user may then access the receipts at a later time to determine where the user bought the component from, on what date, and details about the component (e.g., model number, name, cost, etc.). In some forms, the app 100 scans the receipt to determine the date the component was purchased and information about the component to provide the user with alerts about the component. For example, the app 100 may be configured to estimate a usable lifetime of the component based on the type of component and may estimate the lifetime based at least in part on the purchase date of the component. The app 100 may be configured to provide alerts about the component over the lifetime of the component such as when maintenance of the component should be completed and when the component is near the end of the lifetime and should be replaced.

The app 100 may also provide the user or installer with a questionnaire to complete when setting up their pool/spa system within the app. The app 100 may prompt the user or installer to answer a series of questions or prompts 246 to input information about the pool/spa system. For example, the questions or prompts may include: "who is providing this installation?"; "enter pool owner information"; "add pool pictures"; "age of pool?", "type of pool?"; "do you winterize your pool?"; "do you use a pool cleaner?"; "who services your pool?"; "approximately what do you spend to operate your pool?"; "what type of pool filter?". The app 100 may use this information to provide alerts and notifications to the user based on the responses to the questions. For example, when the app 100 determines that the user's pool filter needs to be replaced, the app 100 may notify the user to replace their pool filter and may provide information about where to get the pool filter from (e.g., the app may provide a link to an online store). As another example, if the user winterizes their pool, the app 100 may provide the user with reminders of when to winterize their pool before freezing temperatures arrive. The app 101 may monitor the forecast and may alert the user when freezing temperatures are in the forecast so that the user may take action before the freezing temperatures arrive.

Figure 19A:
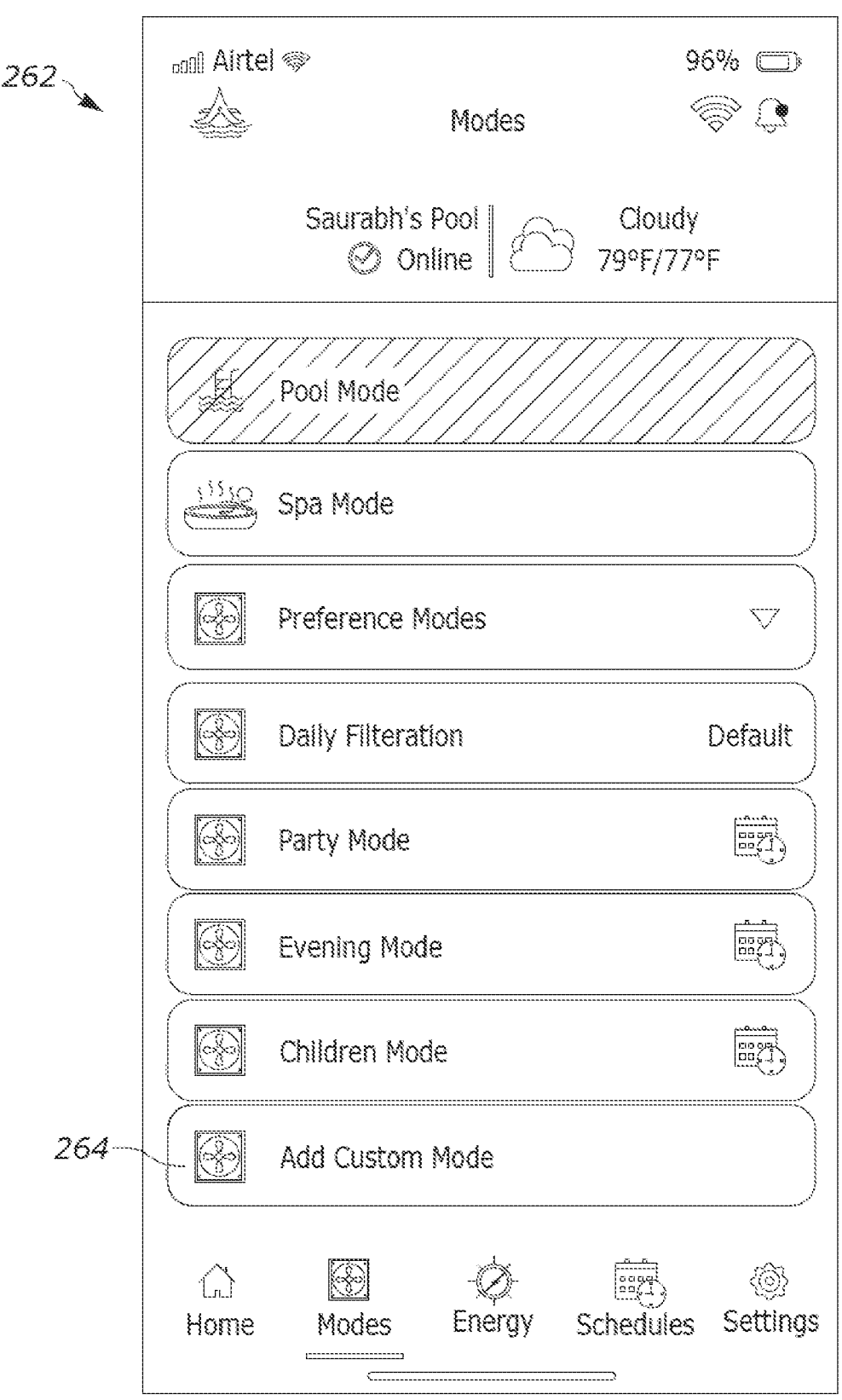
FIGS. 19A-19B are screenshots of an example page of the smartphone application of FIG. 1 for adding a custom mode of operation of the pool and/or spa system.
Figure 19B:
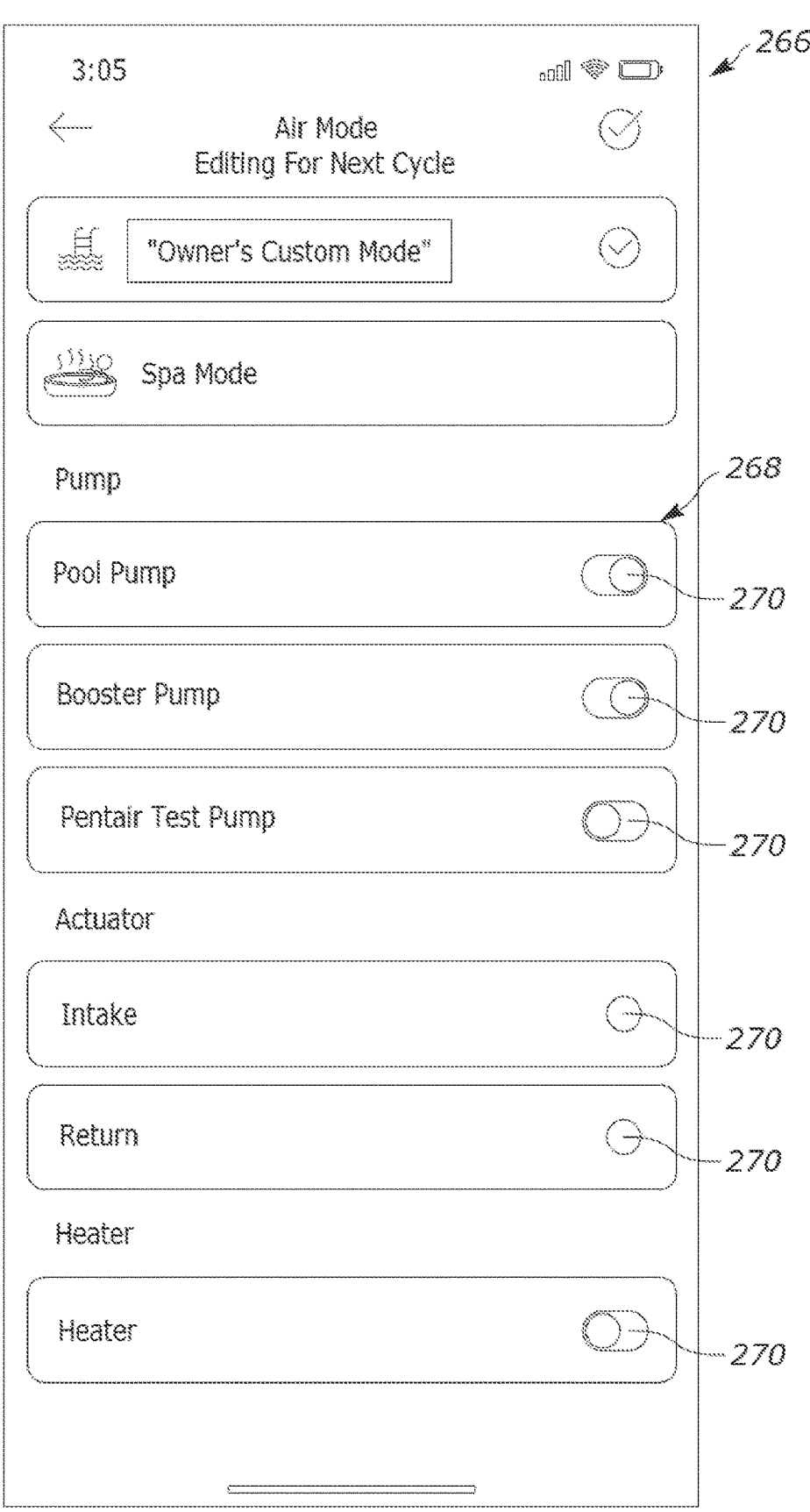

With respect to FIGS. 19A-19B, example screens are shown for creating a custom mode of operation for the pool/spa system. Regarding FIG. 19A, the modes page 262 is shown listing various modes the user may select from to operate the pool/spa system. The mode page 262 includes an "add custom mode" button 264 that the user may select from to create a custom mode. The app 100 may prompt the user to enter a name for the custom mode. Once the user selects the button 264, the app 100 may open a mode editing page 266 shown in FIG. 19B. As shown in FIG. 1913, the custom mode created is named "Owner's Custom Mode." The user may select "Owner's Custom Mode" from the list of modes presented at the top of the page 266 to edit the settings associated with that mode. The user may then select which components of the pool/spa system will be operating when the Owner's Custom Mode is selected. The page 266 includes a list 268 of pool/spa equipment associated with the user's pool/spa system within the app. A toggle switch 270 is provided next to each of the items in the list 268 of pool/spa equipment that the user may use to set whether each piece of equipment will be running when the Owner's Custom Mode is selected.

In addition to the above apparatus and systems, it should be understood that numerous methods have also been disclosed herein. For example, methods for controlling pool/spa equipment have been disclosed, methods of efficiently controlling pool/spa equipment have been disclosed, methods of controlling cross-branded or multi-supplier pool/spa equipment have been disclosed, methods for customizing pool/spa equipment controlling software have been disclosed, methods for operating pool/spa equipment have been disclosed, etc.

In some aspects, the techniques described herein relate to a pool or spa equipment system including: a pool/spa device; and a user device instantiating a user application, the user application configured to: receive input to add the pool/spa device to a pool and/or spa system of the user application; present a graphical interface prompting a user to enter information about the pool/spa device; receive connectivity information of the pool/spa device; and communicate with the pool/spa device based at least in part on the connectivity information.

In some aspects, the techniques described herein relate to a pool or spa equipment system wherein to receive connectivity information of the pool/spa device includes scanning a code of the pool/spa device.

In some aspects, the techniques described herein relate to a pool or spa equipment system wherein the user application is further configured to receive an image of the pool/spa device and associate the image with the pool/spa device in the user application.

In some aspects, the techniques described herein relate to a pool or spa equipment system wherein the user application is further configured to receive input of a device category and a manufacturer of the pool/spa device.

In some aspects, the techniques described herein relate to a pool or spa equipment system wherein the user application is further configured to receive an image of a receipt for the pool/spa device and associate the receipt with the with the pool/spa device in the user application.

In some aspects, the techniques described herein relate to a pool or spa equipment system wherein to communicate with the pool/spa device includes causing adjustment of an operational parameter of the pool/spa device.

In some aspects, the techniques described herein relate to a pool or spa equipment system wherein to communicate with the pool/spa device includes communicating with the pool/spa device via a network.

In some aspects, the techniques described herein relate to a method of adding a pool/spa device to a pool and/or spa system of a user application, the method including: receiving input, at a user device, via the user application to add the pool/spa device to the pool and/or spa system of the user application; presenting a graphical interface prompting a user to enter information about the pool/spa device; receiving connectivity information of the pool/spa device; and communicating from the user device with the pool/spa device based at least in part on the connectivity information.

In some aspects, the techniques described herein relate to a method wherein receiving connectivity information of the device includes scanning a code of the pool/spa device.

In some aspects, the techniques described herein relate to a method further including receiving an image of the pool/spa device and associating the image with the pool/spa device in the user application.

In some aspects, the techniques described herein relate to a method further including receiving input of a device category and a manufacturer of the pool/spa device.

In some aspects, the techniques described herein relate to a method further including receiving an image of a receipt for the pool/spa device and associating the receipt with the with the pool/spa device in the user application.

In some aspects, the techniques described herein relate to a method wherein communicating with the pool/spa device includes causing adjustment of an operational parameter of the pool/spa device.

In some aspects, the techniques described herein relate to a method wherein communicating with the pool/spa device includes communicating with the pool/spa device via a network.

In some aspects, the techniques described herein relate to a pool or spa equipment system including: a plurality of pool or spa equipment provided by a plurality of different pool or spa equipment suppliers; a local network; and a software application configured to connect to the plurality of pool or spa equipment via the local network despite the plurality of different pool or spa equipment being provided by a plurality of different pool or spa equipment suppliers, the software application configured to receive and display current parameter data of the connected plurality of pool or spa equipment, the software application including an interface to receive input to adjust at least one parameter of the plurality of pool or spa equipment.

In some aspects, the techniques described herein relate to a pool or spa equipment system wherein the plurality of different pool or spa equipment includes at least one of a fluid pump, heater, bubble generator, jet generator, feature and/or lights and adjusting the parameters includes adjusting parameters associated with at least one of the fluid pump, heater, bubble generator, jet generator, feature and/or lights In some aspects, the techniques described herein relate to a pool or spa equipment system wherein the software application is configured to control the plurality of pool or spa equipment via the network, the software application including an energy efficient mode and a less energy efficient mode selectable by a user.

In some aspects, the techniques described herein relate to a pool or spa equipment system wherein the software application adjusts at least one parameter of the plurality of pool or spa equipment to increase the energy efficiency when the energy efficient mode is selected in the software application.

In some aspects, the techniques described herein relate to a pool or spa equipment system wherein the plurality of pool or spa equipment includes at least two pool heaters, wherein selecting the less energy efficient mode operates the at least two pool heaters together to heat an associated pool and/or spa more quickly.

In some aspects, the techniques described herein relate to a pool or spa equipment system wherein the interface of the software application presents one or more modes of operation selectable by a user, each mode of operation associated with a set of parameters for the plurality of pool or spa equipment such that selection of a mode of operation of the one or modes of operation applies the associated set of parameters to the plurality of pool or spa equipment.

In some aspects, the techniques described herein relate to a pool or spa equipment wherein the software application is configured to receive input to add a custom mode of operation and to create a set of parameters for the plurality of pool or spa equipment when the custom mode of operation is selected.

In some aspects, the techniques described herein relate to a method of adjusting pool or spa equipment parameters in a multi-vendor pool or spa equipment system, the method including: providing a pool or spa equipment system including a plurality of different pool or spa equipment provided by a plurality of different pool or spa equipment suppliers with each of the plurality of different pool or spa equipment having its own adjustable parameters; connecting the plurality of different pool or spa equipment to a software application via a local network; receiving and displaying current parameter data of the connected plurality of different pool or spa equipment on the software application; and via the software application, adjusting the parameters of any one of the connected plurality of different pool or spa equipment.

In some aspects, the techniques described herein relate to a method wherein the parameters include at least one of power on/off, network connectivity, energy efficiency, pool or spa mode, temperature, fluid hardness (or total hardness), chlorine or bromine level, free chlorine or bromine, pH, fluid alkalinity (or total alkalinity), fluid stabilizer, fluid salinity, fluid acidity, fluid pump speed, bubble generator, jet generator, and/or lights, and adjusting the parameters includes adjusting at least one of the power on/off, network connectivity, energy efficiency, pool or spa mode, temperature, fluid hardness (or total hardness), chlorine or bromine level, free chlorine or bromine, pH, fluid alkalinity (or total alkalinity), fluid stabilizer, fluid salinity, fluid acidity, heater temperature, fluid pump speed, bubble generator, jet generator, and/or lights.

In some aspects, the techniques described herein relate to a method wherein the plurality of different pool or spa equipment includes at least one of a fluid pump, heater, bubble generator, jet generator, feature and/or lights and adjusting the parameters includes adjusting parameters associated with at least one of the fluid pump, heater, bubble generator, jet generator, feature and/or lights.

In some aspects, the techniques described herein relate to a non-transitory storage medium storing a computer program executable by a processor based system, the computer program causing the processor based system to execute the steps including: receiving and displaying parameter data from a plurality of different pool or spa equipment provided by a plurality of different pool or spa equipment suppliers; and providing an interface to adjust the parameter data of at least one of the plurality of different pool or spa equipment.

In some aspects, the techniques described herein relate to a non-transitory storage medium wherein the plurality of different pool or spa equipment includes at least two of the following: a fluid pump, heater, bubble generator, jet generator, feature device and/or lights and altering the parameter data includes adjusting parameters associated with at least one of the fluid pump, heater, bubble generator, jet generator, feature device and/or lights.

In some aspects, the techniques described herein relate to a pool or spa equipment system including: a plurality of different pool or spa equipment provided by a plurality of different pool or spa equipment suppliers; a local network; and a software application capable of connecting to the plurality of different pool or spa equipment via the local network despite the fact the plurality of different pool or spa equipment is provided by a plurality of different pool or spa equipment suppliers.

In some aspects, the techniques described herein relate to a pool or spa equipment system including: a plurality of pool/spa equipment configured to communicate via a network; a user device instantiating a software application configured to monitor and control the plurality of pool/spa equipment via the network, the software application including an energy efficient mode and a less energy efficient mode selectable by a user.

In some aspects, the techniques described herein relate to a pool or spa equipment system wherein the software application adjusts at least one parameter of the plurality of pool/spa equipment to increase the energy efficiency when the energy efficient mode is selected in the software application.

In some aspects, the techniques described herein relate to a pool or spa equipment system wherein the plurality of pool/spa equipment includes at least two pool heaters, wherein selecting the less energy efficient mode operates the at least two pool heaters together to heat an associated pool and/or spa more quickly.

In some aspects, the techniques described herein relate to a non-transitory storage medium storing a computer program executable by a processor based system, the computer program causing the processor based system to execute the steps including: at a user device instantiating a user application configured to control a plurality of pool/spa equipment of a pool/spa system: receiving, via a user interface of the user device, an input to add a custom mode of operation of the pool/spa equipment; presenting, via the user interface, a graphical user interface enabling the user to set operational parameters for at least a portion of the plurality of pool/spa equipment when in the custom mode of operation; presenting, via the user interface, a button selectable by the user to enter the custom mode of operation; and upon receiving input selecting the button, adjusting the one or more of the plurality of pool/spa equipment to the operational parameters set by the user for the custom mode of operation.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B. Also, when mentioning multiple pieces of pool/spa equipment (e.g., a plurality of pool/spa equipment), it should be noted these may all be of the same brand of equipment or they may all be different brands, or a mixture of similar brands and different brands, One benefit of the concepts disclosed herein, is that they are capable of working with one particular brand of equipment or with a plurality of different brands of equipment.

While there have been illustrated and described particular embodiments of the present invention, those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

16

What is claimed is:

1. A pool or spa equipment system comprising:
a pool and/or spa controller to be installed at a pool and/or spa having a pool/spa device, the pool and/or spa controller being separate from the pool/spa device and configured to be operably coupled to the pool/spa device when installed at the pool and/or spa; and
a user device instantiating a user application and configured to communicate with the controller via a network, the user application configured to establish communication between the pool and/or spa controller and the pool/spa device based at least in part on manufacturer information of the pool/spa device by:
receiving input to add the pool/spa device to a pool and/or spa system of the user application;
presenting a graphical interface prompting a user to enter identifying information about the pool/spa device to be added to the pool and/or spa system, the identifying information including manufacturer information of the pool/spa device;
receiving identifying information of the pool/spa device from the user, the identifying information including the manufacturer information usable by the pool and/or spa controller to communicate with the pool/spa device; and
sending the identifying information to enable the pool and/or spa controller to communicate with the pool/spa device based at least in part on the received identifying information of the pool/spa device.

2. The pool or spa equipment system of claim 1 wherein to receive identifying information of the pool/spa device includes scanning a code of the pool/spa device.

3. The pool or spa equipment system of claim 1 wherein the user application is further configured to receive an image of the pool/spa device and associate the image with the pool/spa device in the user application.

4. The pool or spa equipment system of claim 1 wherein the identifying information includes a device category and a manufacturer of the pool/spa device.

5. The pool or spa equipment system of claim 1 wherein sending the identifying information to enable the pool and/or spa controller to communicate with the pool/spa device includes enabling the pool and/or spa controller to communicate with the pool/spa device to cause adjustment of an operational parameter of the pool/spa device.

6. The pool or spa equipment system of claim 1 wherein sending the identifying information to enable the pool and/or spa controller to communicate with the pool/spa device includes enabling the pool and/or spa controller to communicate with the pool/spa device via a network.

7. A pool or spa equipment system comprising:
a controller configured to be operably coupled to a pool/spa device; and
a user device instantiating a user application and configured to communicate with the controller, the user application configured to:
receive input to add the pool/spa device to a pool and/or spa system of the user application;
present a graphical interface prompting a user to enter information about the pool/spa device;
receive connectivity information of the pool/spa device; and
communicate with the pool/spa device based at least in part on the connectivity information,
wherein the user application is further configured to receive an image of a receipt for the pool/spa device and associate the receipt with the with the pool/spa device in the user application.

8. A method of establishing communication between a pool and/or spa controller and a pool/spa device of a pool and/or spa system with a user application of the pool and/or spa system, the method comprising:

receiving input, at a user device, via the user application to add the pool/spa device to the pool and/or spa system of the user application;

presenting via the user application a graphical interface prompting a user to enter identifying information about the pool/spa device to be added to the pool and/or spa system, the identifying information including manufacturer information of the pool/spa device;

receiving identifying information of the pool/spa device from the user via the user application, the identifying information including the manufacturer information and usable by the pool and/or spa controller to communicate with the pool/spa device; and sending the identifying information to enable the pool and/or spa controller installed at a pool and/or spa of the pool and/or spa system to communicate with the pool/spa device based at least in part on the identifying information of the pool/spa device, the pool and/or spa controller being separate from the pool/spa device and configured to be operably coupled to the pool/spa device when installed at the pool and/or spa.

9. The method of claim 8 wherein receiving identifying information of the pool/spa device includes scanning a code of the pool/spa device.

10. The method of claim 8 further comprising receiving an image of the pool/spa device and associating the image with the pool/spa device in the user application.

11. The method of claim 8 wherein the identifying information includes a device category and a manufacturer of the pool/spa device.

12. The method of claim 8 wherein sending the identifying information to enable the pool and/or spa controller to communicate with the pool/spa device includes enabling the pool and/or spa controller to communicate with the pool/spa device to cause adjustment of an operational parameter of the pool/spa device.

13. The method of claim 8 wherein sending the identifying information to enable the pool and/or spa controller to communicate with the pool/spa device includes enabling the pool and/or spa controller to communicate with the pool/spa device via a network.

14. A method of adding a pool/spa device to a pool and/or spa system of a user application, the method comprising:

receiving input, at a user device, via the user application to add the pool/spa device to the pool and/or spa system of the user application;

presenting a graphical interface prompting a user to enter information about the pool/spa device;

receiving connectivity information of the pool/spa device;

communicating from the user device with the pool/spa device based at least in part on the connectivity information; and receiving an image of a receipt for the pool/spa device and associating the receipt with the with the pool/spa device in the user application.

15. A pool or spa equipment system comprising:

a pool and/or spa controller configured to be installed at a pool and/or spa having a plurality of pool or spa equipment provided by a plurality of different pool or spa equipment suppliers, the pool and/or spa controller being separate from the plurality of pool or spa equipment and configured to be operably coupled to the plurality of pool or spa equipment when installed at the pool and/or spa, the pool and/or spa controller configured to control one or more pool or spa equipment of the plurality of pool or spa equipment; and a software application configured to establish communication between the pool and/or spa controller and each of the one or more pool or spa equipment based at least in part on manufacturer information of each the one or more pool or spa equipment by receiving identifying information of each of the one or more pool or spa equipment to be controlled by the pool and/or spa controller, the identifying information including manufacturing information of each of the one or more pool or spa equipment, the identifying information of each of the one or more pool or spa equipment usable by the pool and/or spa controller to communicate with the respective one of the one or more pool or spa equipment, the software application configured to communicate with the pool and/or spa controller via a network to send the received identifying information of each of the one or more pool or spa equipment to enable the pool and/or spa controller to communicate with each of the one or more pool or spa equipment based on the identifying information despite the plurality of different pool or spa equipment being provided by a plurality of different pool or spa equipment suppliers, the software application configured to display current parameter data of the plurality of pool or spa equipment received from the pool and/or spa controller via the network, the software application including an interface to receive input to adjust at least one parameter of the one or more pool or spa equipment.

16. The pool or spa equipment system of claim 15 wherein the plurality of different pool or spa equipment comprises at least one of a fluid pump, heater, bubble generator, jet generator, feature and/or lights and adjusting the parameters comprises adjusting parameters associated with at least one of the fluid pump, heater, bubble generator, jet generator, feature and/or lights.

17. The pool or spa equipment system of claim 15 wherein the software application is configured to control the one or more pool or spa equipment via a network, the software application including an energy efficient mode and a less energy efficient mode selectable by a user.

18. A pool or spa equipment system comprising:

a controller configured to be operably coupled to a plurality of pool or spa equipment provided by a plurality of different pool or spa equipment suppliers, the controller configured to control one or more pool or spa equipment of the plurality of pool or spa equipment; and a software application configured to communicate with the controller via a network to enable the controller to control the one or more pool or spa equipment despite the plurality of different pool or spa equipment being provided by a plurality of different pool or spa equipment suppliers, the software application configured to receive and display current parameter data of the plurality of pool or spa equipment, the software application including an interface to receive input to adjust at least one parameter of the one or more pool or spa equipment, wherein the software application is configured to control the one or more pool or spa equipment via the network, the software application including an energy efficient mode and a less energy efficient mode selectable by a user, wherein the software application adjusts at least one parameter of the one or more pool or spa equipment to increase the energy efficiency when the energy efficient mode is selected in the software application.

19. A pool or spa equipment system comprising:

a controller configured to be operably coupled to a plurality of pool or spa equipment provided by a plurality of different pool or spa equipment suppliers, the controller configured to control one or more pool or spa equipment of the plurality of pool or spa equipment; and a software application configured to communicate with the controller via a network to enable the controller to control the one or more pool or spa equipment despite the plurality of different pool or spa equipment being provided by a plurality of different pool or spa equipment suppliers, the software application configured to receive and display current parameter data of the plurality of pool or spa equipment, the software application including an interface to receive input to adjust at least one parameter of the one or more pool or spa equipment, wherein the software application is configured to control the one or more pool or spa equipment via the network, the software application including an energy efficient mode and a less energy efficient mode selectable by a user, wherein the plurality of pool or spa equipment includes at least two pool heaters, wherein selecting the less energy efficient mode operates the at least two pool heaters together to heat an associated pool and/or spa more quickly.

20. The pool or spa equipment system of claim 19 wherein the interface of the software application presents one or more modes of operation selectable by a user, each mode of operation associated with a set of parameters for the plurality of pool or spa equipment such that selection of a mode of operation of the one or modes of operation applies the associated set of parameters to the plurality of pool or spa equipment.

21. The pool or spa equipment of claim 20 wherein the software application is configured to receive input to add a custom mode of operation and to create a set of parameters for the plurality of pool or spa equipment when the custom mode of operation is selected.

* * * * *